US012588089B2

(12) United States Patent
Wang et al.

(10) Patent No.: US 12,588,089 B2
(45) Date of Patent: Mar. 24, 2026

(54) METHODS FOR ENABLING MULTI-LINK WLANs

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Li-Hsiang Sun, San Diego, CA (US); Joseph S. Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 408 days.

(21) Appl. No.: 17/626,347

(22) PCT Filed: Jul. 13, 2020

(86) PCT No.: PCT/US2020/041814
§ 371 (c)(1),
(2) Date: Jan. 11, 2022

(87) PCT Pub. No.: WO2021/011476
PCT Pub. Date: Jan. 21, 2021

(65) Prior Publication Data
US 2022/0287122 A1 Sep. 8, 2022

Related U.S. Application Data

(60) Provisional application No. 62/873,587, filed on Jul. 12, 2019, provisional application No. 62/932,840, filed on Nov. 8, 2019.

(51) Int. Cl.
*H04W 76/15* (2018.01)
*H04W 8/26* (2009.01)
*H04W 48/16* (2009.01)

(52) U.S. Cl.
CPC ............ *H04W 76/15* (2018.02); *H04W 8/26* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 8,982,820 B1 | 3/2015 | Cordeiro et al. | |
| 2009/0323608 A1 | 12/2009 | Adachi et al. | |

(Continued)

FOREIGN PATENT DOCUMENTS

| | | |
|---|---|---|
| CN | 109417755 A | 3/2019 |
| EP | 3997899 A1 | 5/2022 |

(Continued)

OTHER PUBLICATIONS

Cariou et al., "Multi-Link Discovery—Part 1," IEEE 802.11-20/0389r2 (Mar. 15, 2020).

(Continued)

*Primary Examiner* — German Viana Di Prisco
(74) *Attorney, Agent, or Firm* — Flaster Greenberg P.C.

(57) ABSTRACT

As disclosed herein, there may be systems, methods, and devices for enabling multi-link wireless local area networks (WLAN). One or more non-AP station (STA) multi-link devices (MLDs) and one or more Access Point (AP) MLD may establish a multi-link association between each other, thereby establishing a multi-link connection that enables improved and more efficient wireless communication.

14 Claims, 14 Drawing Sheets

(56) References Cited

U.S. PATENT DOCUMENTS

| | | | |
|---|---|---|---|
| 2015/0257085 A1 | 9/2015 | Zhang et al. | |
| 2016/0198350 A1 | 7/2016 | Lou et al. | |
| 2016/0345253 A1 | 11/2016 | Bergstrom | |
| 2018/0206143 A1* | 7/2018 | Patil | H04L 45/245 |
| 2018/0206190 A1 | 7/2018 | Cherian et al. | |
| 2018/0302930 A1 | 10/2018 | Wang et al. | |
| 2019/0082373 A1 | 3/2019 | Patil et al. | |
| 2019/0082463 A1 | 3/2019 | Patil et al. | |
| 2019/0116545 A1 | 4/2019 | Verma et al. | |
| 2019/0150214 A1 | 5/2019 | Zhou et al. | |
| 2019/0335454 A1* | 10/2019 | Huang | H04W 72/542 |
| 2020/0221545 A1* | 7/2020 | Stacey | H04W 48/16 |
| 2022/0132610 A1* | 4/2022 | Guo | H04L 47/34 |
| 2022/0240333 A1* | 7/2022 | Jang | H04W 76/15 |
| 2024/0049318 A1* | 2/2024 | Dong | H04W 48/10 |

FOREIGN PATENT DOCUMENTS

| | | | |
|---|---|---|---|
| JP | 2016-096587 A | 5/2016 | |
| JP | 2018-137819 A | 8/2018 | |
| RU | 2676048 C1 | 12/2018 | |
| TW | 201921986 A | 6/2019 | |
| WO | 2017070487 A1 | 4/2017 | |
| WO | WO 2018/136520 A1 | 7/2018 | |

OTHER PUBLICATIONS

Cariou et al., "Multi-Link Discovery—Part 2," IEEE 802.11-20/0390r3 (Feb. 13, 2020).

Chitakar et al., "Multi-link acknowledgement," IEEE 802.11-19/1512r6 (Sep. 10, 2019).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.1 (Apr. 2019).

Huang et al., "Extremely Efficient Multi-band Operation," IEEE 802.11-19/0822r0 (May 12, 2019).

Huang et al., "Multi-link Setup Follow Up II," IEEE 802.11-20/0387r3 (Mar. 9, 2020).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information Technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Transit Links within Bridged Networks, IEEE 802.11ak-2018 (Mar. 8, 2018).

Jang et al., "Indication of Multi-link Information," IEEE 802.11-20/0028r5 (Jan. 13, 2020).

Montemurro, "EHT TIG Agenda," IEEE 802.11-18/1067r2 (Jul. 10, 2018).

Patil et al., "Container for advertising ML Information," IEEE 802.11-20/0357r3 (Mar. 15, 2020).

Patil et al., "MLO Discovery Signaling," IEEE 802.11-20/0356r3 (Mar. 15, 2020).

Patil et al., "Multi-link Association Setup," IEEE 802.11-19/1525r2 (Sep. 2019).

Patil et al., "Multi-Link Operation: Design Discussion," IEEE 802.11-19/0823r0 (May 2, 2019).

Seok et al., "EHT Multi-link Operation," IEEE 802.11-19/0731r0 (May 15, 2019).

Seok et al., "Enhanced Multi-band/Multi-channel Operation," IEEE 802.11-19/0766r1 (May 14, 2019).

Wang et al., "Discussion on Multi-link Operations," IEEE 802.11-19/1213r0 (Jul. 9, 2019).

Wang et al., "Follow Up Discussion on Multi-link Operations," IEEE 802.11-20/0119r2 (Jan. 10, 2020).

Wang et al., "Further Discussion on Multi-link Operations," 802.11-19/1568r2 (Sep. 12, 2019).

Yang et al., "Discussion on EHT Study Group Formation," IEEE 802.11-18/1180r0 (Jul. 9, 2018).

Po-Kai Huang (Intel), "Extremely Efficient Multi-band Operation" IEEE 802.11-19/0822r0, IEEE, May 12, 2019, 25 pages.

EP 3997899 A1, Publication not available. Related Publication of WO 2021/011476 A1 provided.

* cited by examiner

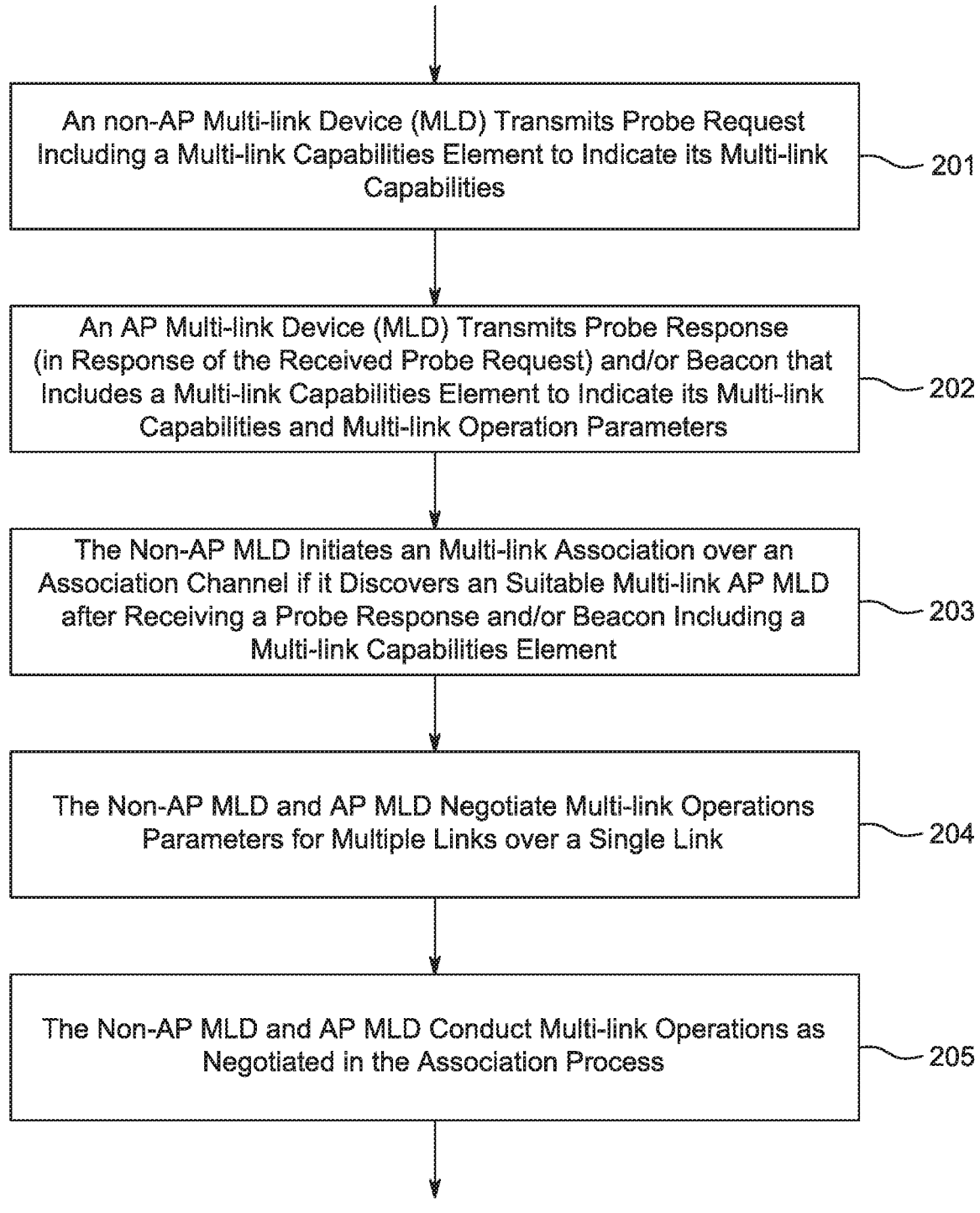

An non-AP Multi-link Device (MLD) Transmits Probe Request
Including a Multi-link Capabilities Element to Indicate its Multi-link
Capabilities ⟶ 201

An AP Multi-link Device (MLD) Transmits Probe Response
(in Response of the Received Probe Request) and/or Beacon that
Includes a Multi-link Capabilities Element to Indicate its Multi-link
Capabilities and Multi-link Operation Parameters ⟶ 202

The Non-AP MLD Initiates an Multi-link Association over an
Association Channel if it Discovers an Suitable Multi-link AP MLD
after Receiving a Probe Response and/or Beacon Including a
Multi-link Capabilities Element ⟶ 203

The Non-AP MLD and AP MLD Negotiate Multi-link Operations
Parameters for Multiple Links over a Single Link ⟶ 204

The Non-AP MLD and AP MLD Conduct Multi-link Operations as
Negotiated in the Association Process ⟶ 205

FIG. 2

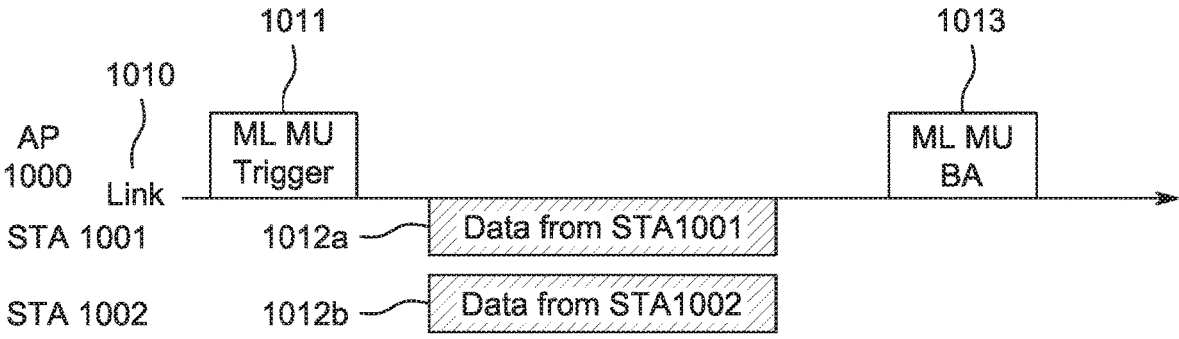
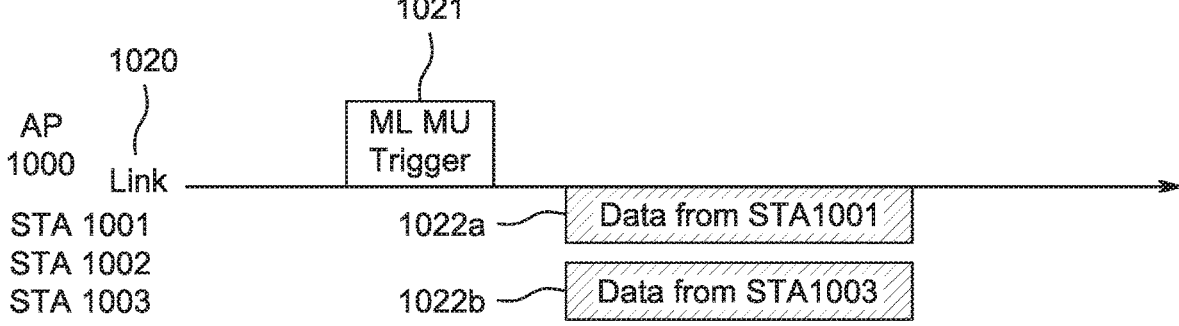
FIG. 10

METHODS FOR ENABLING MULTI-LINK WLANs

CROSS REFERENCE TO RELATED APPLICATION

This application is the U.S. National Stage, under 35 U.S.C. §371, of International Application No. PCT/US2020/041814 filed Jul. 13, 2020, which claims the benefit of U.S. Provisional Application No. 62/873,587, filed on Jul. 12, 2019, and U.S. Provisional Application No. 62/932,840, filed on Nov. 8, 2019, the contents of which are hereby incorporated by reference herein.

BACKGROUND

In wireless local area networks, new use cases have arisen as the wireless technological landscape advances. Currently, there is a need for more efficient use of the spectrum that these wireless technologies utilize, especially in 802.11 systems, to address these new use cases.

SUMMARY

As disclosed herein, there may be systems, methods, and devices for enabling multi-link wireless local area networks (WLAN). There may be a procedure for one or more stations (STA) devices and one or more Access Points (AP) devices for establishing a multi-link association between the one or more devices, thereby establishing a multi-link connection that enables improved and more efficient wireless communication. There may be a multi-link channel feedback protocol for load balancing and optimal performance. There may be a multi-link operation mode adjustment procedure. In order to handle the multi-link communication, there may be one or more multi-link architectures and addressing protocols. Further, there may by a multi-link frame number assignment protocol. There may also be a multi-link acknowledgement procedure for multi-link transmissions.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 2 is a flow diagram of an example multi-link discovery and association procedure;

FIG. 10 is a diagram of an example procedure for multi-link multi-STA acknowledgement.

DETAILED DESCRIPTION

Figure 1A:
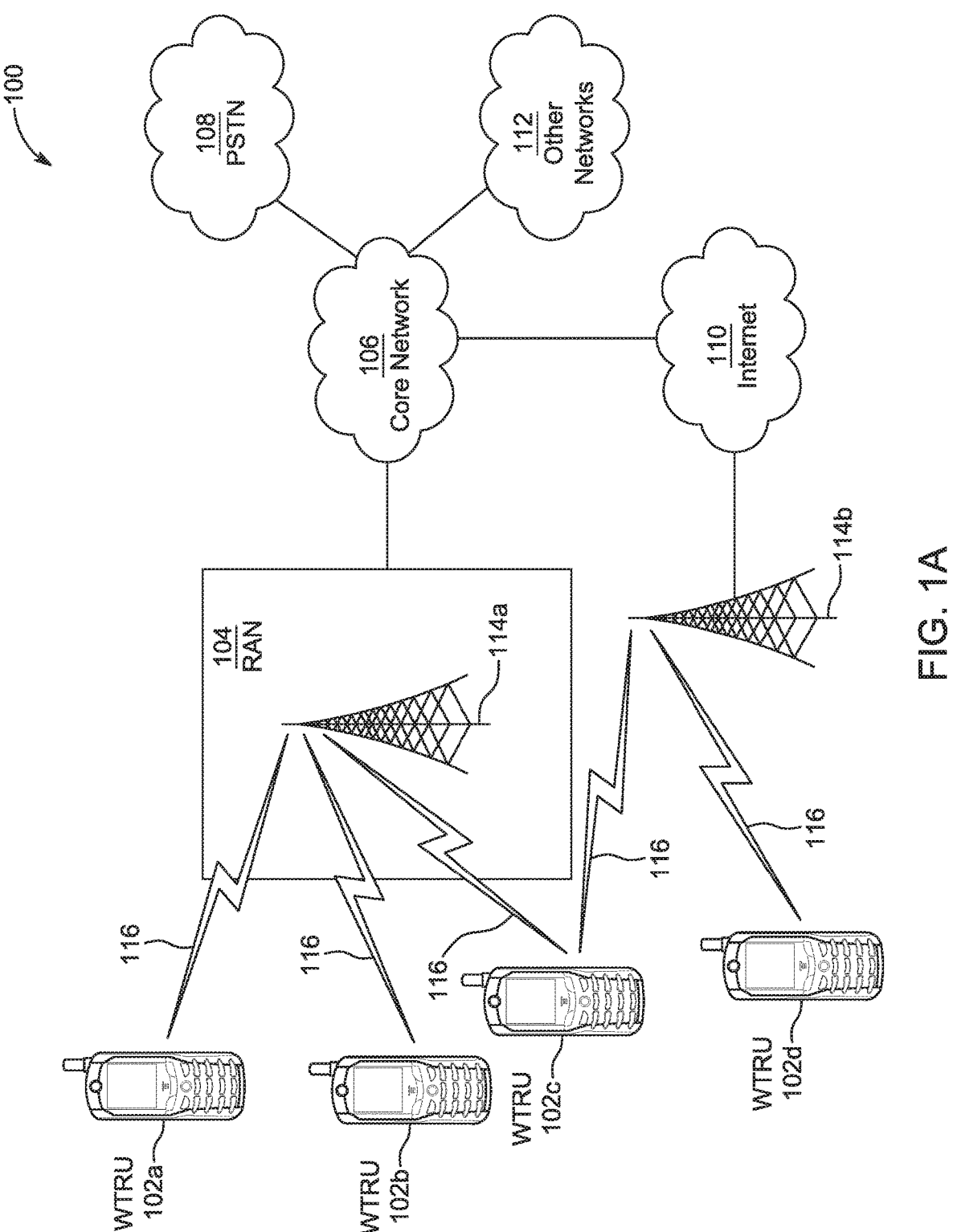
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations (e.g., AP STA), networks, and/or network elements. Each of the WTRUs 102a, 102b, 102c, 102d may be any type of device configured to operate and/or communicate in a wireless environment. By way of example, the WTRUs 102a, 102b, 102c, 102d, may be configured to transmit and/or receive wireless signals and may be equivalent to, or include, a user equipment (UE), a mobile station (STA), a fixed or mobile subscriber unit, a subscription-based unit, a pager, a cellular telephone, a personal digital assistant (PDA), a smartphone, a STA, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE. As discussed herein, a WTRU may interchangeably be referred to as a STA, and a STA may be interchangeably referred to as a WTRU; as disclosed herein a STA and a WTRU may be equivalent and/or the same. Further, as discussed herein there may be various examples that refer to a station (STA), and it is intended that these STAs may be both an AP STA or a non-AP STA. Further, each STA and/or WTRU may be multi-link devices and interchangeably referred to as a STA MLD, WTRU MLD, AP MLD, or the like.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one scenario, the base station 114a may include three transceivers (e.g., one for each sector of the cell). In one scenario, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In one scenario, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In one scenario, the base station 114a and the WTRUs 102a, 102b, 102c may implement a radio technology such as NR Radio Access, which may establish the air interface 116 using NR.

In one scenario, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other scenarios, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one scenario, the base station 114b and the WTRUs 102c, 102d may implement a radio technology such as IEEE 802.11 to establish a wireless local area network (WLAN). In one scenario, the base station 114b and the WTRUs 102c, 102d may implement a radio technology such as IEEE 802.15 to establish a wireless personal area network (WPAN). In another scenario, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or Wi-Fi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
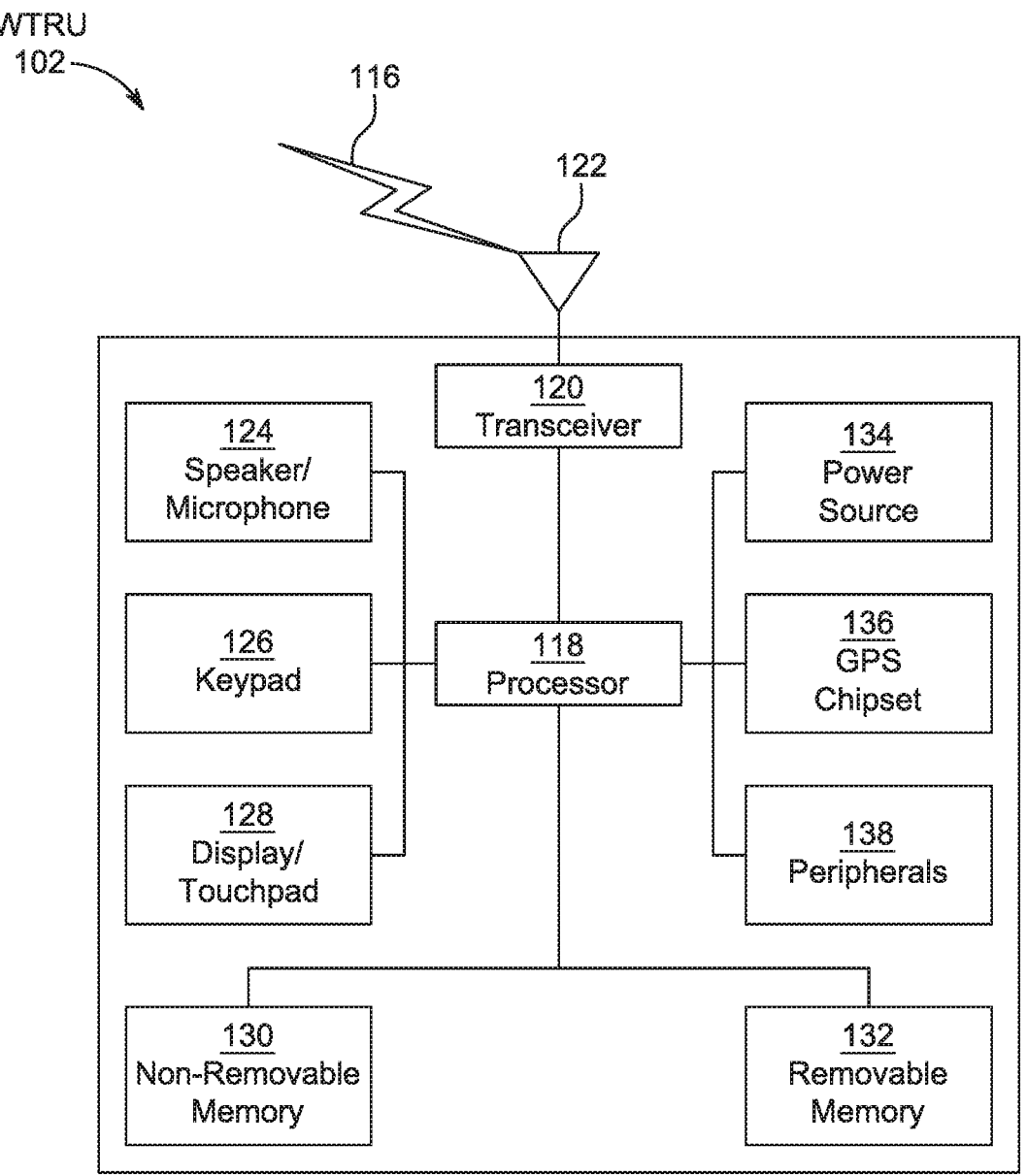
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, the transmit/receive element 122 may be an antenna configured to transmit and/or receive RF signals. In one scenario, the transmit/receive element 122 may be an emitter/detector configured to transmit and/or receive IR, UV, or visible light signals, for example. In another scenario, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one scenario, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCad), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality (VR) and/or Augmented Reality (AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In one scenario, the WTRU 102 may include a half-duplex radio for which transmission and reception of some or all of the signals (e.g., associated with particular subframes for either the UL (e.g., for transmission) or the DL (e.g., for reception)).

Figure 1C:
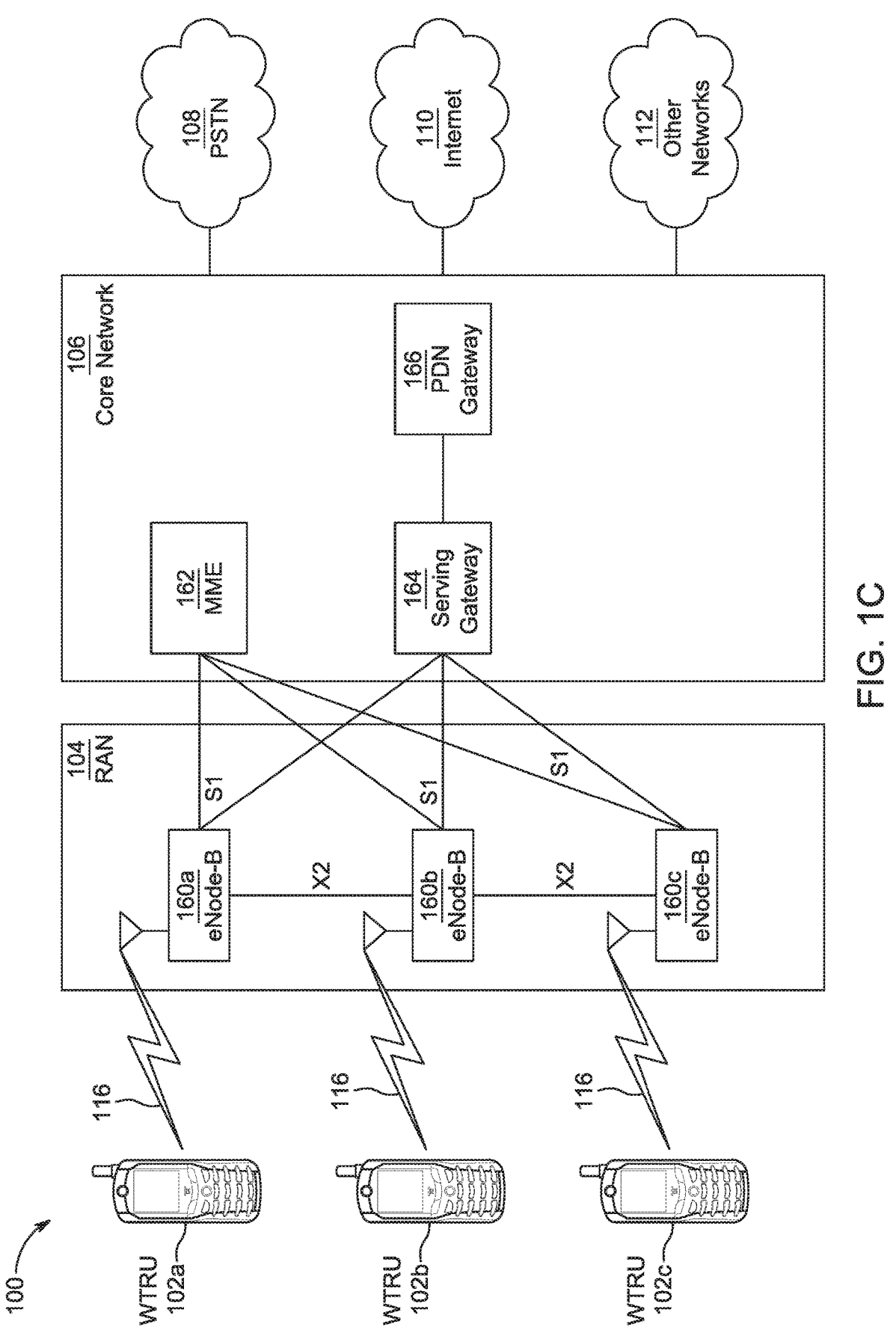
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to one or more embodiments. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one scenario, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1E as a wireless terminal, it is contemplated that in certain representative embodiments that such a terminal may use (e.g., temporarily or permanently) wired communication interfaces with the communication network.

Figure 1D:
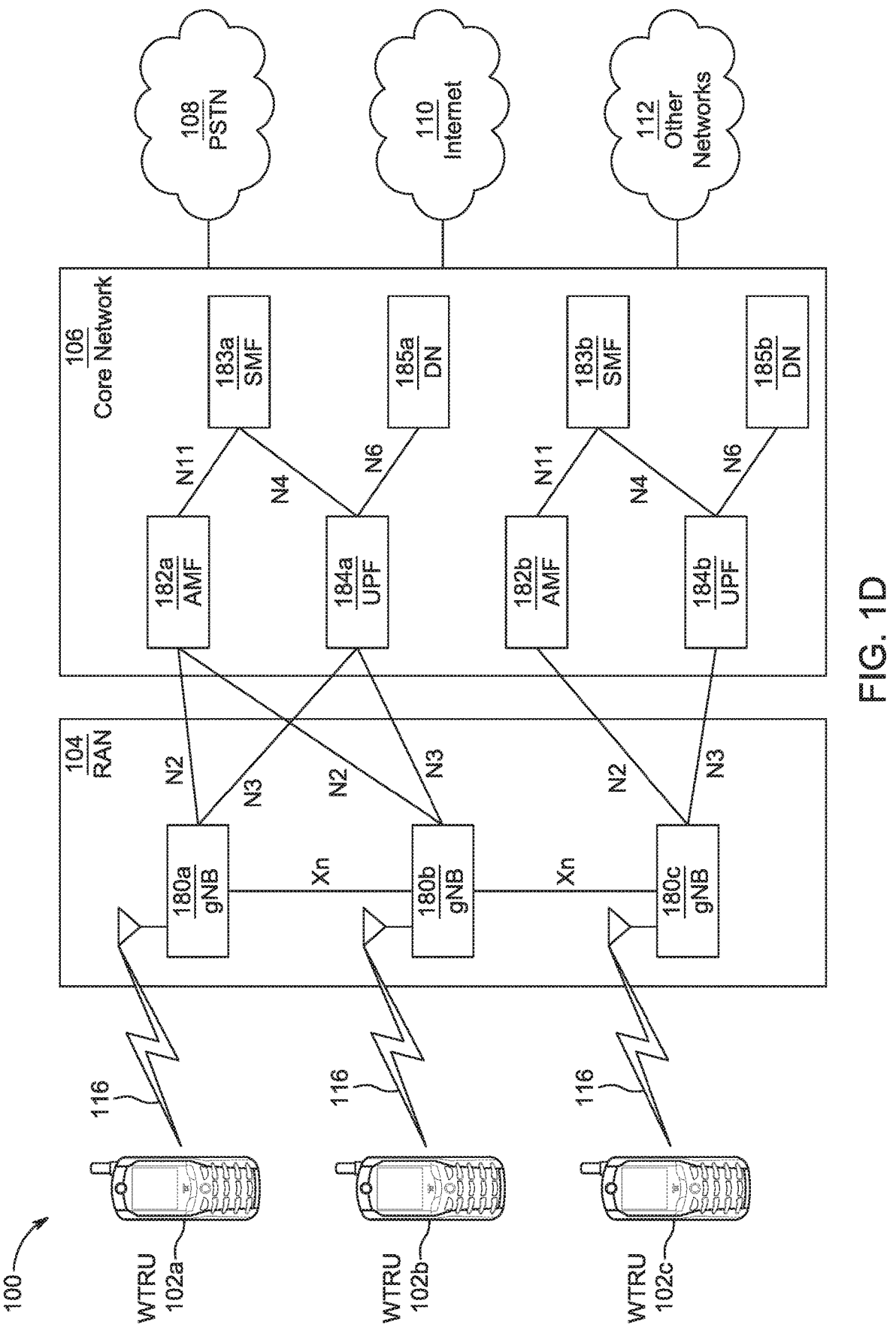
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one scenario, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In one scenario, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In one scenario, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one scenario, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1E, and the corresponding description of FIGS. 1A-1E, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, APs 190a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Additionally/Alternatively, one or more, or all, of the functions described herein with regard to one or more of: STAs 102a-d, APs 190a-b, and/or any other device(s) described herein such as AP STAs and non-AP STAs, may be logical entities. Each logical entity may be contained in one or more physical devices and/or housings. For example, there may be two logical APs contained in one physical multi-link device (MLD); the MLD may be referred to as an AP despite containing more than one logical AP. In another example, there may be two logical STAs in one physical housing (e.g., a MLD smartphone); the physical housing may be referred to as a STA despite containing more than one logical STA. A physical housing or MLD may contain one or more logical entities of one or more devices, such as one housing containing with two logical STAs and two logical APs. As discussed herein, a MLD may be, and interchangeable with, an AP MLD and/or a non-AP MLD.

Additionally/Alternatively, channels may be used interchangeably with links as discussed herein.

Figure 1E:
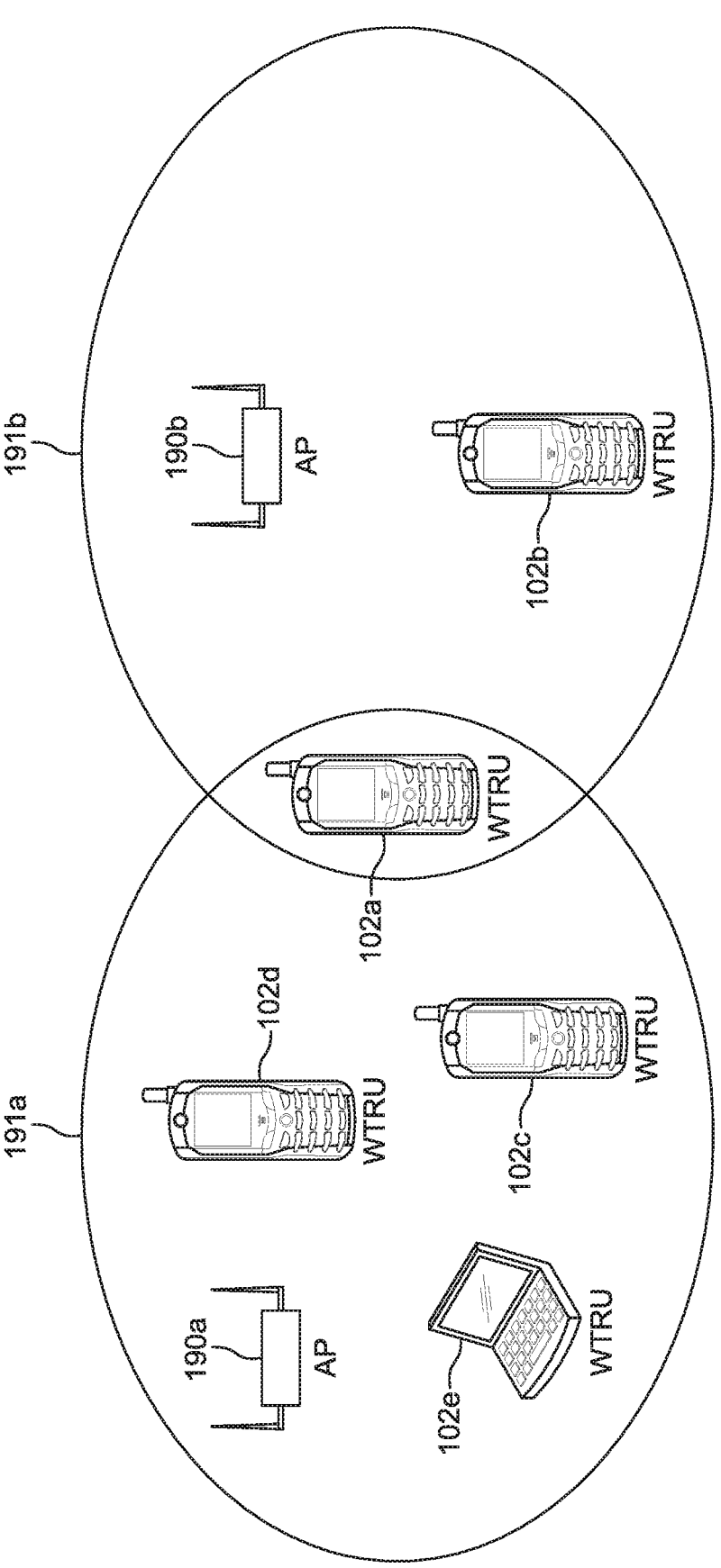
FIG. 1E is a system diagram illustrating an example communications system in which one or more disclosed embodiments may be implemented.

In some examples, the other network 112 of FIG. 1A may be a wireless local area network (WLAN), such as defined by IEEE 802.11. FIG. 1E is a system diagram illustrating an example communication system (e.g., WLAN).

A WLAN in Infrastructure Basic Service Set (BSS) 191a and 191b mode may each have an Access Point (AP) 190a and 190b, respectively, for the BSSs 191a and 191b and one or more WTRUs 102a-e (e.g., STAs) associated with the APs 190a, 190b. As discussed herein, a given BSS may be referred to as a network and may refer to communication that occurs locally. The APs 190a, 190b may have access or an interface to a Distribution System (DS) or another type of wired/wireless network that carries traffic in to and/or out of the BSS (not shown). Traffic to WTRUs that originate from outside of a BSS (e.g., 191a, 191b) may arrive through an AP (e.g., 190a, 190b) and may be delivered to the WTRUs. Traffic originating from WTRUs 190c-e to destinations outside BSS 191a may be sent to the AP 190a to be delivered to respective destinations. Traffic between WTRUs 190c-e within the BSS 191a may be sent through the AP 190a, for example, where the source WTRU 102c may send traffic to the AP 190a and the AP 190a may deliver the traffic to the destination STA 190d. Traffic between STAs (e.g., 190c-e) within a BSS (e.g., 191a) may be considered and/or referred to as peer-to-peer traffic. The peer-to-peer traffic may be sent between (e.g., directly between) the source and destination WTRUs with a direct link setup (DLS). In some cases, the DLS may use an 802.11e DLS or an 802.11z tunneled DLS (TDLS).

In some cases, a WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, an AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In some situations, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, then that particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. In some situations, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems that may support multiple channels and channel bandwidths, such as 802.11n, 802.11ac, 802.11af, and 802.11ah, may include a channel that may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (e.g., which supports only a 1 MHz operating mode) transmitting to the AP, all available frequency bands may be considered busy even though a majority of the available frequency bands remains idle.

In the United States the available frequency bands that may be used by 802.11ah may be from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Generally, the High Efficiency WLAN (HEW) may address the need to enhance the quality of service that all users experience for a broad spectrum of wireless users in many usage scenarios including high-density scenarios in the 2.4 GHz, 5 GHz and 6 GHz band. Use cases that support dense deployments of APs, and STAs, and associated Radio Resource Management (RRM) technologies may be included in HEW. Potential applications for HEW may include usage scenarios high user density scenarios (e.g., train stations, stadium events, enterprise/retail environments, etc.), may address increased dependence on video/data delivery and wireless services for medical applications. HEW may be implemented in 802.11ax.

Potential applications for HEW may include emerging usage scenarios such as, but not limited to, data delivery for stadium events, high user density scenarios such as train stations, or enterprise/retail environments, and also evidence for an increased dependence on video delivery, and wireless services for medical applications.

Additionally, 802.11ax may address traffic for a variety of scenarios that have short packets. The scenarios include: Virtual office; TPC ACK; Video streaming ACK; Device/Controller (Mice, keyboards, Game controls, etc.); Access—Probe request/response; Network selection—probe requests, ANQP; and/or, Network management—Control frames.

Also, for 802.11ax, there may be multi-user (MU) features that include UL and DL OFDMA and UL and DL MU-MIMO. Further, there may be mechanisms for multiplexing UL random access for different purposes may also be included in 802.11 ax.

802.11 Extremely High Throughput (EHT) may follow 802.11ax. EHT may address the increasing peak throughput and improve the efficiency of 802.11 networks. EHT may be included in 802.11be. One use case for 802.11be may comprise applications that require high throughput and low latency such as: Video-over-WLAN; Augmented Reality (AR); and/or Virtual Reality (VR).EHT and 802.11be may employ one or more of the following features that achieve the target of increased peak throughput and improved efficiency, such as: Multi-AP; Multi-Band/multi-link; 320 MHz bandwidth; 16 Spatial Streams; HARQ; Full Duplex (in time and frequency domain); AP Coordination; Semi-Orthogonal Multiple Access (SOMA); and/or, new designs for 6 GHz channel access.

For 802.11be multi-link operations, there may be a high-level MAC Architecture enabling multi-link operation. There may also be duplication detection and replay detection on multiple links. There may also be different modes of multi-channel/multi-band operations that may provide gains for multi-band/multi-link operations.

Generally, in order to achieve improvements in the 802.11 field, there may be several issues that need to be addressed, such as: multi-link multi-ap association, dynamic feedback for load balancing and interference management; multi-link Tx/RX operation mode adjustment; multi-link architecture (e.g., multi-link non-AP device architecture, multi-link MAC architecture, multi-link design and 802.11ak MAC architecture); frame number assignment (e.g., multi-link acknowledgement for fragmented packets, packet number assignment, fragmentation across multiple STAs/APs); and/or, multi-link acknowledgement.

Regarding the issue of multi-link multi-AP association, both an AP and a STA may be multi-link devices. Additionally, there may be multiple APs in multi-AP sets, and the STA and AP may need to be notified of each other's capabilities and preferences and conduct the proper association procedures for the optimal performance and for correct setting of the multi-link operation modes.

In one approach to address the above issue, there may be an efficient discovery and association procedure to enable optimal performance for Multi-link operations. A multi-link AP, which may be a member of a multi-AP set, may advertise one or more of its multi-link capabilities and multi-link operation parameters in one or more of the elements in its beacon, short beacons, Fast Initial Link Setup (FILS) Discovery frames, and unicast or broadcast probe responses, such as: a multi-link capabilities element; a multi-link operation element; a real-time capabilities element; and/or, a real-time operation element.

A multi-link capabilities element may contain one or more of the following parameters for the multi-link capabilities that is supported by the AP: number of bands; number of channels; multi-link mode; maximum (max.) number of concurrently supported channels or links per device; max channel width supporter per device; security mode; and/or, channel aggregation mode.

The number of bands parameter may indicate the number of bands that the transmitting AP or transmitting Multi-AP set supports. This may be indicated using a bitmap to indicate one or more bands including sub 1 GHz band, 2.4 GHz band, 5 GHz band, 3.5 GHz band and 6 GHz bands.

The number of channels parameter may be used to indicate the number of channels or links that the transmitting AP or multi-AP set is capable of supporting for one or more bands that are supported.

The multi-link mode parameter may indicate one or more modes where the multi-link operations can be supported. This parameter may include independent operation on channels, channel aggregations, load balancing, dynamic channel selection, dynamic AP selection, and the like.

The max. number of concurrently supported channels per device parameter may specify the maximal number of concurrently supported channels per multi-link device or per multi-link STA. For example, this may be in terms of individual channels or channels of 20 MHz bandwidth.

The max. channel width supported per device parameter may specify the maximal channel width that can be supported (e.g., 80 MHz, 160 MHz, 240 MHz, 320 MHz, etc.).

The security mode parameter may specify whether security should be done on each link per device, or should be conducted on the home/control/association channel, or should be done once with the master AP and apply to all links, which may be used together with a virtual AP ID.

The channel aggregation mode parameter may specify whether channel aggregation needs to be contiguous or non-contiguous. In another example, this parameter may be specified per supported band to specify whether the channel aggregation on that band needs to be contiguous or non-contiguous.

A multi-link operation element may indicate the current multi-link operation parameters, such as: active bands; active channels; home/anchor channel/association/control channel; virtual AP ID; multi-link BSS color; security mode; and/or, current multi-link channel sets.

The active bands parameter may specify that the current active bands that are being used for multi-link operations by the transmitting AP or the multi-AP set. This may be indicated using a bitmap to indicate one or more bands including sub 1 GHz band, 2.4 GHz band, 5 GHz band, 3.5 GHz band and 6 GHz bands.

The active channels parameter may indicate the active channels that are being used for the multi-link operation. In one example, a bitmap is used to indicate the active channels used for multi-link operations. In another example, a bitmap is used for each active band to indicate the active channels used for multi-link operation in each band. In another example, a list of fields may be used to describe one or more active channels that are currently active as multi-link channels. Each of the fields may contain one or more of Channel width, channel number, channel operating class, and the like.

The home/anchor channel/association/control channel parameter may specify the home channel, or anchor channel, association channel and/or control channels. Such a channel may be used by a STA to conduct association or exchange control channel or as a default channel when participating in the multi-link operation.

The virtual AP ID parameter indicates the ID of the virtual AP for which the multi-AP set is represented. This may be a BSSID or a MAC address, which may be the ID of the AP that is operating on the anchor or association channel, or maybe the ID of the MAC address for the higher service access point (SAP) connecting to the DS.

The multi-link BSS color parameter identifies the multi-link AP device. The BSS color may be the same for links associated with the same multi-link AP device if the multi-link AP device cannot conduct independent TX/RX MAC operation on different links. The multi-link BSS color may be different for links associated with the same multi-link AP device if the multi-link AP device can conduct independent TX/RX MAC operation on the links. One or more multi-link BSS color may be provided for different links associated with the same multi-link AP device and sensitivity levels may also be included for these multi-link BSS colors for other MLDs to adjust their CCA levels when receiving one of these multi-link transmissions and determine whether the medium is idle or busy and to determine whether spatial reuse should be conducted.

The security mode parameter specifies the current security mode. For example, the security may be done on each link per device, or should be conducted on the home/control/association channel, or should be done once with the master AP and applies to all links, which may be used together with a virtual AP ID.

The current multi-link channel sets parameter may contain one or more multi-link channel sets that a STA may use as a fixed set of channels for multi-link operations. The STA may choose one or more sets of such channels after association.

A real-time capabilities element may contain the capabilities for indicating real-time traffic capabilities, such as the following parameters: delay; jitter; traffic specifications (spec); number of concurrent streams; and/or, number of concurrent real-time traffic channels.

The delay parameter specifies the max and/or min delay that the AP or multi-AP set is capable to provide.

The jitter parameter specifies the max and/or min delay that the AP or multi-AP set is capable to provide.

The traffic spec parameter specifies the traffic spec that the AP or multi-AP set is capable to provide.

The number of concurrent streams parameter indicates the number of concurrent real-time traffic that the AP or multi-AP set can support.

The number of concurrent real-time traffic channels parameter indicates the number of concurrent channels that can be used to support one real-time traffic stream.

A real-time operation element may specify the current parameters for real-time traffic streams, such as: delay; jitter;

traffic spec, additional number of streams; number of concurrent real-time traffic channels; and/or, current concurrent real-time traffic channel set.

The delay parameter specifies the current max and/or min delay that the AP or multi-AP set is capable to provide.

The jitter parameter specifies the current max and/or min delay that the AP or multi-AP set is capable to provide.

The traffic spec parameter specifies the traffic spec for any additional real-time traffic that the AP or multi-AP set is capable to provide, such as priority, data rates, or the like.

The additional number of concurrent streams parameter indicates the number of additional concurrent real-time traffic streams that the AP or multi-AP set can support currently.

The number of concurrent real-time traffic channels parameter indicates the current number of concurrent channels that can be used to support one real-time traffic stream.

The current concurrent real-time traffic channel set parameter indicates the current set of concurrent channels that can be used to support real-time traffic streams.

A multi-link device, which may contain one or more multi-link STAs, may advertise one or more of its multi-link capabilities, real-time capabilities and multi-link and real-time requests in one or more of the following elements in its probe requests, association requests: multi-link capabilities element; multi-link request element; real-time capabilities element; and/or, real-time request element.

The multi-link capabilities element may contain one or more of the parameters for the multi-link capabilities that is supported by the STA, such as: number of bands, number of channels, multi-link mode, maximum (max.) number of concurrently supported channels, and/or channel aggregation mode.

The number of bands parameter indicates the number of bands that the transmitting STA or device supports. This may be indicated using a bitmap to indicate one or more bands including sub 1 GHz band, 2.4 GHz band, 5 GHz band, 3.5 GHz band and 6 GHz bands.

The number of channels parameter may be used to indicate the number of numbers that the transmitting STA is capable of supporting for one or more bands that are supported.

The multi-link mode parameter indicates one or more modes that the multi-link operations can be supported. This parameter may include independent operation on channels, channel aggregations, load balancing, dynamic channel selection, dynamic AP selection, or the like.

The max. number of concurrently supported channels parameter specifies the maximal number of concurrently supported channels. For example, this may be in terms of individual channels or channels of 20 MHz bandwidth.

The max. channel width supported parameter specifies the maximal channel width that can be supported, e.g., 80 MHz, 160 MHz, 240 MHz, 320 MHz, or the like.

The Channel Aggregation mode parameter specifies whether channel aggregation needs to be contiguous or non-contiguous. In another example, this parameter may be specified per supported band to specify whether the channel aggregation on that band needs to be contiguous or non-contiguous.

A multi-link request element may indicate the request for multi-link operations, such as the following parameters: requested bands, requested channels, virtual STA ID, and/or requested multi-link channel sets.

The requested bands parameter specifies the requested active bands that are being used for multi-link operations. This may be indicated using a bitmap to indicate one or more bands including sub 1 GHz band, 2.4 GHz band, 5 GHz band, 3.5 GHz band and 6 GHz bands.

The requested channels parameter may indicate the requested channels for the multi-link operation. In one example, a bitmap is used to indicate the requested channels used for multi-link operations. In another example, a bitmap is used for each requested band to indicate the requested channels used for multi-link operation in each band. In another example, a list of fields may be used to describe one or more requested channels as multi-link channels. Each of the field may contain one or more of Channel width, channel number, channel operating class, or the like.

The virtual STA ID parameter indicates the ID of the virtual STA for which the multi-link device is represented. This may be a MAC address, which may be the ID of the STA that is operating on the anchor or association channel, or maybe the ID of the MAC address for the higher SAP connecting to the DS.

The requested multi-link channel sets parameter may contain one or more multi-link channel sets that a STA may use as a fixed set of channels for multi-link operations.

A real-time capabilities element may contain the capabilities for indicating real-time traffic capabilities, such as the following parameters: delay, jitter, and/or number of concurrent real-time traffic channels.

The delay parameter specifies the max and/or min delay that the STA or device is capable to provide.

The jitter parameter specifies the max and/or min delay that the STA or device is capable to provide.

The number of concurrent real-time traffic channels parameter indicates the number of concurrent channels that can be used to support one real-time traffic stream.

A real-time request element specifies the parameters for the requested real-time traffic streams, such as the following: delay, jitter, traffic spec, requested number of concurrent streams, requested number of concurrent real-time traffic channels, and/or requested concurrent real-time traffic channel set.

The delay parameter specifies the requested max and/or min delay.

The jitter parameter specifies the requested max and/or min delay.

The traffic spec parameter specifies the traffic spec for the requested real-time traffic stream, such as priority, data rates, and the like.

The requested number of concurrent streams parameter indicates the number of requested real-time traffic streams.

The requested number of concurrent real-time traffic channels parameter indicates the requested number of concurrent channels that can be used to support one real-time traffic stream.

The requested concurrent real-time traffic channel set parameter indicates the requested set of concurrent channels that can be used to support real-time traffic streams.

In an embodiment, there may be a multi-link multi-AP discovery and association procedure. A multi-link AP, which may be a member of a multi-AP set, may advertise one or more of its multi-link capabilities, multi-link operation element, real-time capabilities element, and/or real-time operation element of one or more of the APs in the multi-AP set in one or more of the elements in its beacon, short beacons, FILS Discovery frames, and unicast or broadcast probe responses.

The multi-link AP may advertise the supported bands and supported channel per supported bands as well supported multi-link operation mode and supported channel aggregation mode, which may be either contiguous or non-contiguous. It may also advertise the max. number of channels per multi-link device and max channel bandwidth per channel. In addition, it may also advertise the security mode supported, which may include setting up security individually on each link or setting up security once with the master AP and the security should apply to all links associated with the non-AP multi-link device.

The multi-link AP may advertise the current active bands and channels used for multi-link operations. It may also indicate one or more multi-link channel sets from which a STA may request to use for its multi-link operations. It may also advertise the home/association/control channels on which the control signaling, and association may be conducted for any non-AP devices. In addition, it may advertise one or more Virtual AP IDs that the non-AP multi-link device should be using to transmit to the AP or multi-AP set. It may also advertise one or more multi-link BSS colors as well as sensitivity levels associated with one or more multi-link BSS colors when determining the channel is idle or busy, or whether to conduct spatial reuse.

The multi-link AP may advertise its real-time traffic support capabilities including the max and min delay or jitter that the AP may be able to support, and/or the max. amount of real-time traffic or the number of real-time traffic streams it may support. It may also advertise the max. number of concurrent channels it supports per multi-link devices.

The multi-link AP may advertise its real-time traffic operation parameters including the max and min delay or jitter that the AP or multi-AP set (MAP) currently may be able to provide, and/or the how much additional real-time traffic or the number of real-time traffic streams it may support. It may also advertise the current real-time traffic concurrent channel set being used.

Multi-link non-AP devices, which may contain one or more non-AP STAs, may advertise one or more the of its multi-link capabilities, multi-link operation requests, real-time capabilities and/or real-time operation request in one or more of the elements in its probe request frames, or association request frames.

A multi-link non-AP device may advertise the supported bands and supported channel per supported bands as well supported multi-link operation mode and supported channel aggregation mode, which may be either contiguous or non-contiguous. It may also advertise the max. number of channels for multi-link operation and max channel bandwidth per channel. In addition, it may also advertise the security mode supported, which may include setting up security individually on each link or setting up security once with the master AP and the security should apply to all links associated with the non-AP multi-link device.

The multi-link non-AP device may indicate requested bands and channels to be used for multi-link operations. It may also indicate one or more multi-link channel sets requested to use for its multi-link operations. In addition, it may advertise one or more Virtual STA IDs that the AP multi-link device should be using to transmit to the non-AP multi-link devices.

The multi-link non-AP device may advertise its real-time traffic support capabilities including the max and min delay or jitter that the multi-link device (MLD) may be able to support, and/or the max. amount of real-time traffic or the number of real-time traffic streams it may support. It may also advertise the max. number of concurrent channels for real-time traffic it supports.

The multi-link non-AP device may advertise its real-time traffic request including the max and min delay or jitter that the MLD is requesting, and/or the how much real-time traffic or the number of real-time traffic streams it is requesting. It may also indicate the request to use real-time traffic concurrent channel set.

A multi-link non-AP STA device may discover multi-link APs or MAPs by monitoring discovery channels or any channels for beacons, short beacons, FILS Discovery frames, or probe responses, or it may send a probe request frames which may include multi-link capability element and/or Real-Time capability element. It may also include multi-link request element and real-time traffic request element to indicate its request for its multi-link operations or real-time traffic requested. The multi-link non-AP STA device may switch to the home/association/control channel if it has received such information from FILS discovery frames, or other type of frames and transmit a probe request frame or to monitor for a beacon, short beacon, or probe response frames. It may also transmit a probe request frames on the channel on which it has received a FILS discovery frame of a suitable multi-link AP or MAP.

A multi-link AP or members of MAP may receive the probe request and may respond with unicast or broadcast probe responses or beacons that may include the multi-link capabilities element, multi-link operation element, real-time capabilities element, real-time operation element to advertise its multi-link and real-time support capabilities and the operation parameters for its multi-link and real-time traffic operations. The MLD and MAP may not respond if the probe request contains parameters for real-time traffic request or multi-link operation request that the MLD or the MAP cannot support.

If the multi-link non-AP STA device has discovered a suitable multi-link AP or MAP by examining received beacons, short beacons, FILS discovery frames, and/or probe responses, it may follow the supported security mode to establish security with the multi-link AP or MAP. For example, the MLD may transmit an authentication frame request indicating that it is establishing a multi-link security containing the address of the master AP or the virtual AP ID. The receiving multi-link AP or member of the MAP may forward the authentication request to the master AP if it is not the master AP or the AP representing the virtual AP ID. The master AP or virtual AP may establish authentication and keys for each link in the multi-link channel set. In another example, the authentication and keys may be the same for links in the multi-link channel set which may be associated with the virtual AP ID and the virtual STA ID. In another example, the authentication and keys may be established for the link on which the authentication request/response exchange is conducted. The authentication and keys on the remainder of the multi-link channel set may be established when the multi-link operation mode is set (on each of the links or on the home/anchor/association link) after the association is conducted and successful. Additionally, the master AP may conduct authentication for all member APs in the MAP. In another example, the authentication and keys may be established for the link between the master AP and MLD or between the responding slave AP and the MLD on the link where the authentication request/response exchange is done. The authentication and keys on the remainder of the multi-link channel set and MAP set may be established when the multi-link operation mode is set (i.e., on each of the links or on the home/anchor/association link) after the association is conducted and successful.

The multi-link non-AP device may send an association request to the multi-link AP or MAP, which may include virtual AP ID, to request association with the AP or MAP. The association request may include a request for multi-link operation parameters, such as band, channel set, and channel requested, as well as real-time traffic spec and parameters that need to be supported. The multi-link AP or the master AP in the MAP may evaluate the request and determine whether the request can be supported. It may respond with an association response indicating the assigned channel set, assigned band, assigned channel aggregation mode and multi-link operation mode of the STA. In one implementation, the association response is only sent on the channel on which the association request is received. The association response may indicate one or more channels, and channel widths on one or more bands as well as the BSSIDs, and multi-link colors on which the STA should conduct association on the indicated band and indicated channel.

The association response may include one association ID (AID) that is associated with the multi-link non-AP STA device. The AID may be an ID assigned to a non-AP STA by the AP during association. The AID may be the same for all links operating on all multi-link channel set and it may be associated with the Virtual AP ID and for the Virtual STA ID. In one example, the AID may only be for the STA ID and associated with the BSSID of the AP that is operating on the link where the association request/response exchange is conducted. There may be additional AIDs assigned to the STA ID associated with the same multi-link non-AP STA device operating on other links of the same multi-link channel set.

FIG. 2 illustrates an example of a multi-link discovery and association and operation procedure. At 201, a non-AP multi-link device (e.g., one or more logical STAs or WTRUs) may transmit a probe request that includes multi-link capabilities information of the non-AP multi-link device. The multi-link capabilities information of the non-AP multi-link device may be in an element or sub-element of the probe request. The probe request may be transmitted to one or more multi-link APs (logical and/or physical) devices. At 202, the one or more multi-link APs may transmit a probe response in response to the probe request indicating multi-link capabilities. The probe response may contain information regarding the capabilities of the one or more multi-link APs. This information may also be in a beacon. The beacon may have one or more multi-link capabilities elements and/or sub-elements which contain this information. This information may include multi-link capabilities of the one or more multi-link APs and/or operational parameters of the one or more multi-link APs.

At 203, the non-AP multi-link device may initiate a multi-link association over an association channel based on the one or more multi-link AP information. In one instance, the association may be performed if the non-AP multi-link device discovers at least one suitable multi-link AP of the one or more multi-link APs based on the multi-link AP information. At 204, the non-AP multi-link device, as part of or after the association, may negotiate multi-link operations parameters for multiple links over a single link. At 205, the non-AP multi-link device may conduct multi-link operations as negotiated (e.g., during the association).

In another example similar to FIG. 2, there may be a method implemented by a wireless transmit receive unit (WTRU) multi-link device (MLD) (e.g., a non-AP STA) for conducting a multi-link communication. The WTRU MLD may send a probe request to an access point (AP) MLD (e.g., AP STA), where the probe request may include an indication of multi-link capabilities of the WTRU MLD. The WTRU MLD may receive a response to the probe request from the AP MLD, the response including AP MLD information, the AP MLD information may include an indication of multicapabilities of the AP MLD and multi-link parameters of the AP MLD. Afterwards, the WTRU MLD may initiate an association with the AP MLD using the AP MLD information. Once associated, the WTRU MLD may communicate on multiple links with the AP MLD, or multiple AP MLDs. For each link of the multiple links, both the WTRU MLD and AP MLD may have a logical entity (e.g., a physical layer). Both the WTRU MLD and AP MLD may each have a multiple MAC layers, one to interface with the upper layers (e.g., an upper MAC) and one to interface with each of the logical entities physical layers (e.g., a lower MAC). In one or more instances, the response may be a beacon, wherein the beacon includes a capabilities element. In one or more instances the capabilities element may include the AP MLD information. In one or more instances the initiating may further include negotiating with the AP MLD multi-link operational parameters based on the AP MLD information. In one or more instances, the negotiating may occur over a single link.

Regarding the issue of dynamic feedback for load balancing and interference management, generally, load balancing may be a multi-link application, and in order to optimally benefit from load balancing, an AP and an STA need to be aware of real-time load as well as interference on each of the available channels.

To address the above issue, there may be an efficient monitoring and feedback mechanisms for AP and STAs to exchange states regarding the channel qualities and interference. A multi-link AP device may periodically schedule sounding over all channels for STAs to conduct channel measurement. Such sounding may be done by transmitting short packets such as null data packet (NDP) frames. In one example, the sounding may also be conducted by regular packets, such as beacons, short beacons, or short FILS Discovery frames.

A multi-link device may maintain the same time synchronization function (TSF) timer on all its' links.

A multi-link AP device may announce in its beacon, short beacon, FILS discovery frames, or other frames, the schedule of these sounding frames. For example, a multi-link AP device may include offsets for beacon or short beacons or FILS Discovery frames. The offset may be using the same TSF timer or using the individual TSF timer on the channel or may be relative to the current Targets Beacon Transmit Time (TBTT), or Target transmit time of the FILS Discovery frame on the current channel.

A multi-link non-AP device may periodically measure the channel by using the offset or schedule for sounding frames, or FILS discovery frame, or other type of frames received. If it measures the channel, it may provide feedback to the multi-link AP. The feedback may be triggered by a triggering frame by the multi-link AP.

For example, the multi-link AP may send a NFRP frame triggering an NDP Feedback Report for multi-link feedback. The NFRP may include the starting channel number and number of channels to be fed back. In another example, the NFRP may include bitmaps for links to be fed back. The multi-link non-AP device may send an NDP Feedback Report using multiple symbols with each symbol representing a bit for feedback for a particular channel, corresponding to the request included in the NFRP frame. It may also send NDP report on different RUs. For example, the bit associated with a particular RU can be a feedback report for a particular link or channel as requested by the NFRP frame.

In another example, the multi-link AP may request multi-link feedback in EHT Control headers as a part of the PHY or MAC header. The EHT control header requesting for multi-link feedback may include the starting channel number and number of channels to be fed back. In another example, the request may include a bitmap for links to be fed back. The multi-link non-AP device may send a multi-link feedback Report in the EHT control field in the MAC or PHY header in a subsequent frame sent to the multi-link AP.

Additionally, the multi-link AP may include in its beacon, short beacon, or FILS Discovery frames a link activity indicator element. The link activity indicator may include details of activity on each link of the multi-link channel set. In one example, the link activity indicator may be in the form of a bitmap. If a bit association with a link is indicated as "0", it means that that link may be considered as saturated with traffic, while a "1" may imply that the traffic may be light for that link and additional traffic may be added on that link. In another example, more bits may be associated with each link in the multi-link set, for example, two bits may be used to indicate the level of activity on a particular link. For example, "0" means very little activities on that link, "1" means some traffic on that link, "2" means heavy traffic on that link and "3" means saturated traffic on that link. Multi-link non-AP STAs may use the link activity indicator received to determine whether they want to move to another link in order to achieve better performance. The choice may be based on both the sounding results as well as the link activity indicator. Note, the values provided herein are merely examples, and any value may be used as long as it to serve as an indication to accomplish the same function as discussed herein; for example, values may be arbitrary, random, algorithmically determined, based on an identifier, sequential, preconfigured, determined in real-time, or the like.

Such a link activity indicator may also be included in MAC headers, such as EHT a-control field in the MAC or PHY headers. The inclusion of such a link activity indicator may be considered as a recommendation for the receiving STAs to switch to one or more of the recommended links, such as links with light traffic. The decision by the STA may also be based on the sounding results of the channel quality as described above.

The multi-link feedback request or response may also be done through newly designed frames such as control frames; control frames such as multi-link feedback request or response frames.

The multi-link feedback request or response may be conducted on the control/anchor/association channel or all channels. The multi-link feedback request or response may be conducted on any link on any channel for any other channels.

Regarding the issue of multi-link TX/RX operation mode adjustment, a WLAN device may be operating in different modes for transmitting and receiving, depending on current applications and power levels.

In order to address the above issue, there may be a protocol that allows for the adjustment of TX and RX operation modes for STAs and APs to support efficient and power efficient operations. A multi-link STA device may initiate TX and RX operation mode change by sending a Multi-link Operation Mode Change (OMC) request to the multi-link AP. The request may be addressed to the master AP or virtual AP or one member AP of the MAP. It may be transmitted on the home/anchor/control channel or on any link. However, the request frame may be sent on a link that will be functioning after the multi-link operation mode change. The Multi-link Operation Mode Change request may also be sent as a part of EHT control header in the MAC or PHY header. The multi-link STA may include one or more bitmaps for indicating requested changes for links operation on different channels. One bitmap may be used for multiple active bands, or one or more bitmap may be used for each supported band. A "0" for a particular link or channel means that the channel or link is requested or remains to be non-active. A "1" for a particular link or channel may mean that the channel or link is requested to be activated or to remain active. In another example, a channel set number may be used to indicate a request to change to a new multi-link channel set. In yet another example, a number of links may be requested to be active by the multi-link non-AP device while the exact active link or channel may be determined by the multi-link AP. A separate bitmap may be used for real-time concurrent links/channels request. In one example, a bitmap for all members of the MAP may be included to indicate a request to switch to a different member AP in the MAP or switch to another link on the same or different member AP in the MAP.

The multi-link operation mode change request may be triggered by change in the number of traffic streams, the number of active real-time traffic streams, the power level of the device, the interference level of the one or more links, and/or the traffic saturation on one or more links.

A member AP of the MAP may forward the request to the master AP. The multi-link AP or master AP may respond (i.e., which may happen through the member AP from which the request is received) with a multi-link operation mode change response frame. The response may be addressed to the virtual STA ID or the STA that transmitted the request. It may be transmitted on the home/anchor/control channel or on any link. However, the response frame may be sent on a link that will be functioning after the multi-link operation mode change. The Multi-link Operation Mode Change response frame may also be sent as a part of an EHT control header in the MAC or PHY header. The multi-link AP or master AP device may include one or more bitmaps for indicating assigned links or channels. One bitmap may be used for multiple active bands, or one or more bitmaps may be used for each supported band. A "0" for a particular link or channel may mean that the channel or link is not assigned or remains to be non-active. A "1" for a particular link or channel may mean that the channel or link is assigned to the multi-link STA device or is to remain active. In another example, a channel set number may be used to indicate assigning a new multi-link channel set to the multi-link STA device. In yet another example, a number of links are being assigned to be active to the multi-link non-AP device. A separate bitmap may be used for real-time concurrent links/channels assignment. In one example, a bitmap for all members of the MAP may be included to indicate assignment to switch to a different member AP in the MAP or switch to another link on the same or different member AP in the MAP.

A multi-link AP device or a master AP may initiate multi-link operation mode change by sending a Multi-link Operation Mode Change (OMC) request to a multi-link non-AP device (e.g., a STA/WTRU). The request may be addressed to the virtual STA ID or the non-AP STA operating on that link. It may be transmitted on the home/anchor/control channel or on any link. However, the request frame may be sent on a link that will be functioning after the multi-link operation mode change. The Multi-link Operation Mode Change request may also be sent as a part of an EHT control header in the MAC or PHY header. The multi-link AP may include one or more bitmaps for indicating requested changes for links operation on different channels. One bitmap may be used for multiple active bands, or one or more bitmap may be used for each supported band. A "0" for a particular link or channel means that the channel or link is requested or remains to be non-active. A "1" for a particular link or channel may mean that the channel or link is requested to be activated or to remain active. In another example, a channel set number may be used to indicate request to change to a new multi-link channel set. In yet another example, a number of links are being requested to be active by the multi-link AP device. A separate bitmap may be used for real-time concurrent links/channels request. In one example, a bitmap for all members of the MAP may be included to indicate a request to switch to a different member AP in the MAP or switch to another link on the same or different member AP in the MAP.

The multi-link operation mode change request may be triggered by change in the number of traffic streams, the number of active real-time traffic streams, the power level of the devices, the interference level of the one or more links, and/or the traffic saturation on one or more links.

The multi-link STA device may respond with a multi-link operation mode change response frame. The response may be addressed to the virtual AP ID or the AP that transmitted the request. It may be transmitted on the home/anchor/control channel or on any link. However, the response frame may be sent on a link that will be functioning after the multi-link operation mode change. The Multi-link Operation Mode Change response frame may also be sent as a part of EHT control header in the MAC or PHY header. In one example, the Multi-link Operation Mode change response frame sent by a multi-link non-AP STA device may simply be an acknowledgement or a rejection of the request by the master AP or the virtual AP ID or the AP that transmitted the request.

The multi-link devices may start using the new multi-link operation mode only if it is acknowledged by the multi-link AP and STA.

Regarding the issue of multi-link non-AP device architecture, both AP and STA may be multi-link devices. Additionally, there may be multiple APs in the multi-AP sets (e.g., that are not collocated with the AP multi-link device), where something needs to keep track of the data flows and on which STAs/links the packets are being transferred. This issue may be addressed by an efficient multi-link non-AP device architecture and address protocol that ensures robustness communications.

In one example, a multi-link non-AP STA device may be represented by a virtual STA ID, which may be indicated by the device in its probe request, association request, or other type of control or management frames. The virtual STA ID may be used on all links to identify the multi-link non-AP device. A multi-link non-AP STA device operating on any links or channel may filter and receive packets that are addressed to the virtual STA ID as well as the MAC address of the STA operating on that link or channel. A multi-link STA or non-AP device may be assigned one AID that is associated with the Virtual STA ID and may be identified as such on all links.

In one example, a multi-link AP device may be represented by a virtual AP ID, which may be indicated by the device in its probe responses, association responses, beacons or short beacons or FILS Discovery frames, or other type of control or management frames. The virtual AP ID may be used on all links to identify the multi-link AP device. A multi-link AP device operating on any link or channel may filter and receive packets that are addressed to the virtual AP ID as well as the MAC address of the AP operating on that link or channel. A multi-link AP device may be assigned one AID that is associated with the Virtual AP ID and may be identified as such on all links by all members APs in the MAP.

In one example, all multi-link AP devices belonging to the same multi-AP set may be represented by a virtual AP ID, which may be indicated by one or more devices in its probe responses, association responses, beacons or short beacons, or FILS Discovery frames or other type of control or management frames. The virtual AP ID may be used on all links to identify the multi-AP set of multi-link APs. Any multi-link AP device in the multi-AP set operating on any link or channel may filter and receive packets that are addressed to the virtual AP ID and/or the MAC address of its or all APs operating on that link or channel. In one example, a multi-link STA device associated with the multi-AP set may be assigned one AID that is associated with the Virtual AP ID and may be identified as such on all links by all members APs in the MAP. In one example, the multi-link STA device may be assigned an AID that has two portions, one portion that is common to all links, and a link specific portion which may identify the link or the AP operating on that link.

A packet that is transmitted to the multi-link STA device may include the virtual STA ID. In one example, a frame that is transmitted to the multi-link STA device may have a destination address (DA) or a receiving address (RA) set to the virtual STA ID. In one example, a packet transmitted to the multi-link STA device may have the RA address set to the MAC address of the STA operating on that link or channel and the DA address set to the virtual STA ID. The BSSID may be set to the Virtual AP ID or to the BSSID of the transmitting AP operating on that link. In one example, the multi-link STA device may be assigned an AID that has two or three portions, one portion that is common to all links and all member APs in the MAP, and a link specific portion which may identify the link or the AP operating on that link, and a third portion that may identify the particular member AP.

A multi-link STA device may respond, for example, to traffic indication map (TIM) indication or null data packets (NDP) feedback report Poll, or any other AID-based schemes if one of the following situations may occur:

The indicated AID may be equal the AID assigned to the multi-link STA device.

The indicated AID may be equal to the common AID portion, and the eliciting frame indicates the virtual AP ID.

The indicated AID may be equal to the combination of the common AID portion assigned as well as the link specific AID portion assigned, and the eliciting frame may indicate the virtual AP ID or BSSID that is specific to the AP operating on the appropriate link or the eliciting frame is received on the appropriate link.

The indicated AID may equal the combination of common AID portion assigned as well as the link specific AID portion assigned and the member AP specific AID portion assigned, and the eliciting frame may indicate the virtual AP ID or BSSID that is specific to the AP operating on the appropriate link or the eliciting frame is received on the appropriate link, and/or the eliciting frame indicates the virtual AP ID or BSSID that is specific to the member AP of the MAP.

A packet, such as a data packet, that is transmitted by a multi-link STA device may include the virtual STA ID that identifies the multi-link non-AP STA device. In one example, a frame, such as a data frame, that transmits to the multi-link STA device may have the Address 3 field or Address 4 field set to the virtual STA ID. The MAC header or PHY header of the frame may also carry an indication that it is a multi-link packet and may carry the Virtual STA ID. In one example, a packet transmitted to the multi-link STA device may have the RA address or Address 1 field set to the MAC address of the STA operating on that link or channel, and the Address 3 field set to the virtual STA ID. The Address 2 field may be set to the Virtual AP ID or to the BSSID of the transmitting AP operating on that link. Additionally, the Address 3 field may be set to the Virtual AP ID. Alternatively or additionally, the BSS Color field in the PHY header may be set to the Multi-link BSS Color or Multi-link Multi-AP BSS Color or Multi-AP BSS Color to indicate that the packet being transmitted is a multi-link addressed PPDU or a multi-link multi-AP PPDU or a multi-AP PPDU. A STA may filter and set NAVs based on the Multi-link or Multi-AP or Multi-AP Multi-Link BSS Color.

A packet that is transmitted to the multi-link STA device may include the virtual STA ID. In one example, a frame that is transmitted to the multi-link STA device may have a DA address or RA address or Address 1 set to the virtual STA ID. In one example, a packet transmitted to the multi-link STA device may have the RA address or Address 1 set to the MAC address of the STA operating on that link or channel, and the DA address may be set to the virtual STA ID. The BSSID or Address 2 field may be set to the Virtual AP ID or to the BSSID of the transmitting AP operating on that link. A packet that is transmitted to the multi-link STA device may contain the BSSID or the MAC address of the transmitting AP on that link or in the multi-AP BS in the Address 2 field and contains the Virtual AP ID in the Address 3 field. A packet that is specifically targeting the STA of the multi-link STA device operating on a particular link may be identified by including the MAC address of the STA (e.g., in the RA address field or Address 1 field). The source address in the downlink packet may be set to the virtual AP ID if the frame is initiated by the master AP. The source address field may be set to the MAC address of the AP operating on that link if it is link specific and not initiated by the master AP.

A packet that is transmitted to the multi-link AP device may include the virtual AP ID. In one example, a frame that is transmitted to the multi-link AP device may have a DA address or RA address or Address 1 field set to the virtual AP ID. In one example, a packet transmitted to the multi-link AP device may have the RA address or Address 1 field set to the MAC address of the AP operating on that link or channel and the DA address or Address 3 field set to the virtual AP ID. The BSSID or Address field 3 may be set to the Virtual AP ID or to the BSSID of the AP operating on that link. The TA address or Address 2 field may be set to the Virtual STA ID of the transmitting non-AP STA. A packet that is specifically targeting the AP of the multi-link AP device operating on a particular link may be identified by including the MAC address of the AP, for example in the RA address field. The source address in the uplink packet may be set to the virtual AP ID if the frame is meant to be forwarded to the master AP or DS. The source address field may be set to the MAC address of the AP operating on that link if it is link specific and not meant to be sent to the master AP or DS.

In another example, To DS and From DS fields may be both set to 1 so that Address 4 can be used by EHT STAs to recognize that the transmitted packet is a multi-link packet. In a multi-link packet to a non-AP STA, Address 1 may be set to the MAC ID of the receiving STA on that link or channel, Address 2 may be set to the Virtual AP STA or the MAC address of the transmitting AP on that link or channel, Address 4 may be set to the Virtual AP ID, and Address 3 may be set to the Virtual STA ID. In a multi-link packet to an AP, Address 1 may be set to the MAC ID of the receiving AP on that link or channel, Address 2 may be set to the Virtual STA ID or the MAC address of the transmitting STA on that link or channel, Address 3 may be set to the Virtual AP ID, and Address 4 may be set to the Virtual STA ID.

When a receiving STA or AP receiving a multi-link packet, which may be indicated by an indication in the PHY or MAC header, and which may be one particular bit or by "To DS" or "From DS" bits, then the receiving STA or AP may interpret the address fields as described above.

Regarding the issue of multi-link MAC architecture, if multi-link devices have multiple lower MAC SAPs, and one single MAC SAP going to/from the DS, then more designs may be needed to facilitate the disclosed architecture to enable correct multi-link operation.

Figure 3A:
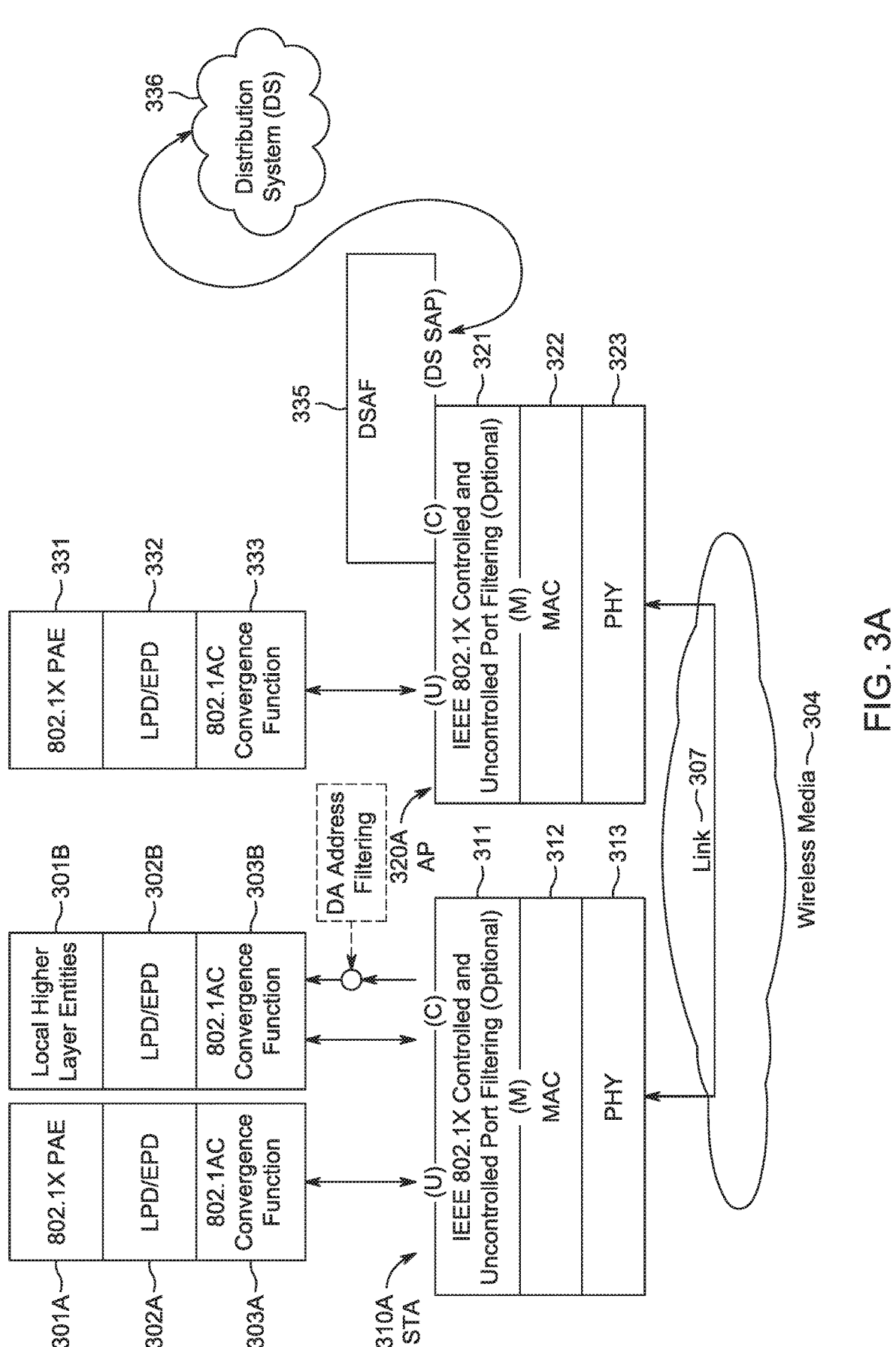
FIG. 3A is a diagram of an example of 802.11 architecture.
Figure 3B:
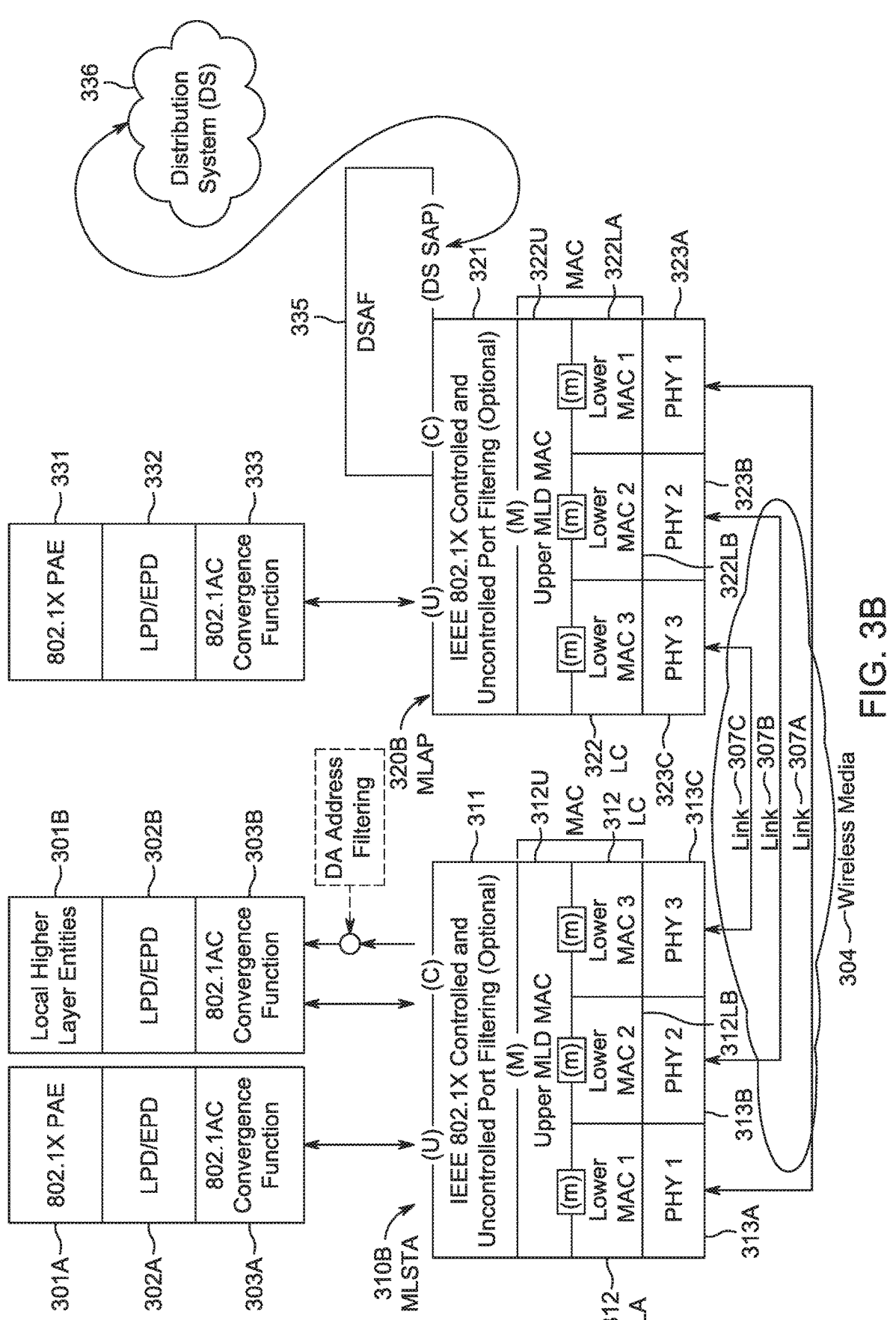
FIG. 3B is a diagram of an example of multi-link architecture.
Figure 3C:
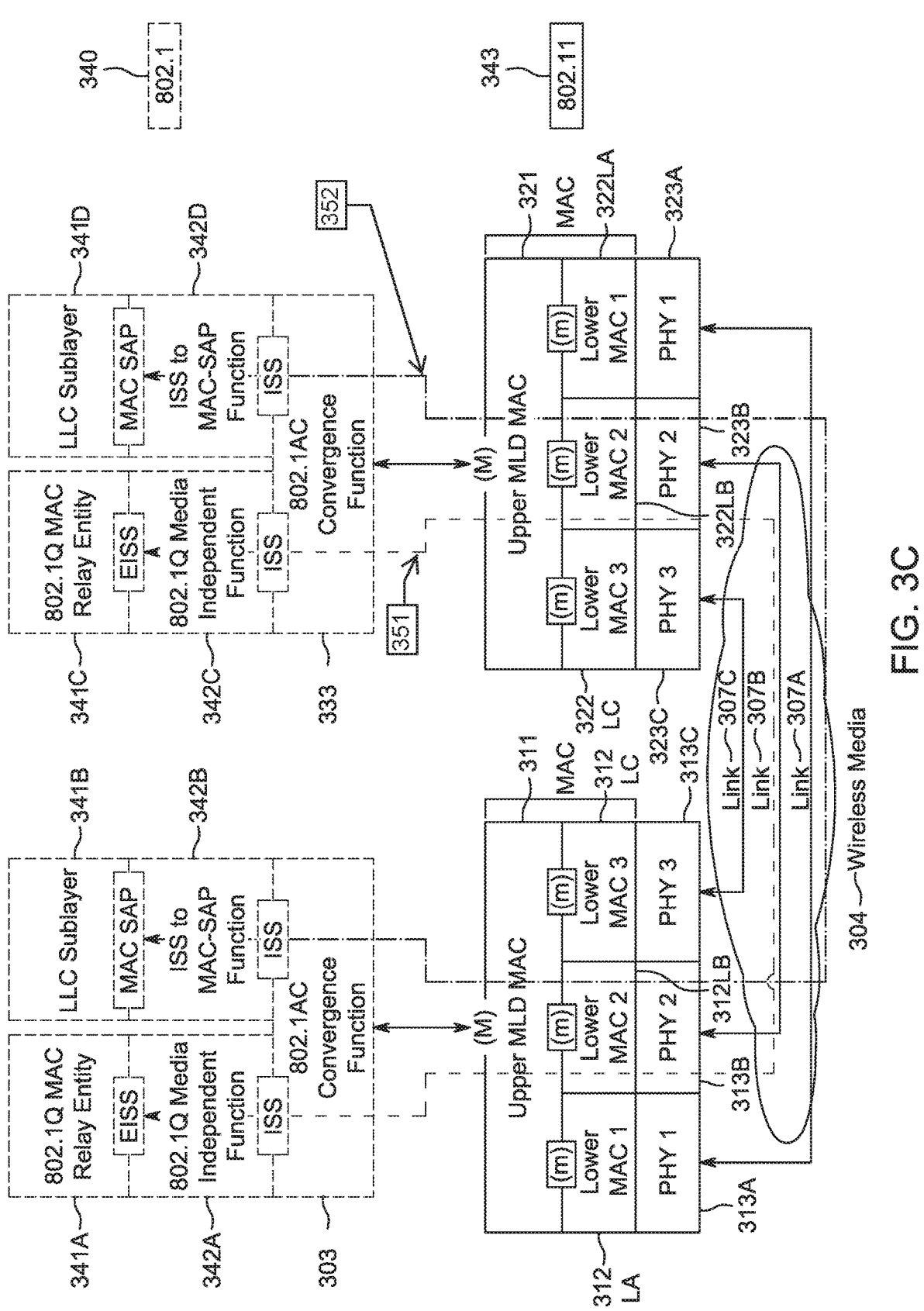
FIG. 3C is a diagram of an example of multi-link GLK architecture.

FIG. 3A is a diagram of an example of 802.11 legacy MAC architecture. FIG. 3B is a diagram of an example multi-link MAC architecture. FIG. 3C is an example of multi-link GLK MAC architecture. For all of FIGS. 3A, 3B, and 3C, like numbering will correspond to like elements.

In FIG. 3A, existing 802.11 architecture and that of 802 in general has several concepts regarding protocol entities, peers, layers, services and clients. Within these concepts there are practices of unbounded stacking of protocol entities. In the example shown, a STA 310 may communicate through a wireless media 304 over a single link 307 to an AP 320A. Each entity may have uncontrolled (U) and controlled (C) ports. Generally, the flow of data is shown through various layers as it travels to and from the STA 310A to/from the AP 320A and out/from a DS 336. In relevant part, a legacy configuration may have a single MAC 312 and PHY 313 for the STA 310A and similarly the AP 320A may have a single MAC 322 and PHY 323.

In view of FIG. 3A, to address multi-link approach (e.g., Link 307A, 307B, and 307C) there may be multiple lower MAC SAPs beneath an upper MAC SAP, which collectively act as a devices MAC function layer for a multi-link scenario, as shown in FIG. 3B. The introduction of this additional layer (e.g., lower MACs) may provide a new/improved and/or an additional set of peers, layer functions, and services for its clients. Accordingly, there may be a peer set of MAC SAPs as described herein to address the above issues.

In an AP such as Multi-Link AP 320B, there may be an upper MAC SAP (e.g., an upper MAC SAP 312U) that may be between the DS (e.g., collectively 335 and 336), or the IEEE 802.1x layer 321, which may be just below the DS, and multiple single link MAC SAPs 322LC, 322LB, 322LA, each with its own PHY layer (e.g., PHY 1 323A, PHY 2 323B, PHY 3 323C) essentially creating individual logical APs for each link (e.g., Link 307A, 307B, and 307C). To the DS this upper MAC SAP may appear to be a standard 802.11 MAC SAP, providing all 802.11 expected services to the DS and the DS may likewise provide all existing 802.11 expected services to this upper MAC SAP. In addition to the currently defined services, there may be additional services discussed herein which may be provided by the upper MAC SAP.

In a non-AP STA, such as Multi-Link STA 310B, there may be a peer upper MAC SAP 312U that may also be located below the LLC layer, or below the 802.1X layer 311, and above multiple single link MAC SAPs 312LA, 312LB, and 312LC (e.g., again, each with their own PHY layer PHY 1 313A, PHY 2 313B, PHY 3 313C).

The MAC services provided by the upper MAC layer (e.g., 312U and/or 322U) may include all of the services provided by any legacy 802.11 MAC service and may also provide additional services to optimize the transmission of frames over multiple 802.11 single links. These additional services may include an additional A-MAC service data unit (MSDU) aggregation/de-aggregation capability, an additional fragmentation/de-fragmentation capability, a sequence number assignment services, a PS defer Queuing and routing services, packet number assignment, and other services as disclosed herein.

Regarding the issue of multi-link design and 802.11ak MAC architecture, in some situations 802.11ak may replace a DS (e.g., 335 and 336) with a direct link to an 802.1 switch (e.g., 340), which manages the data flow over the 802.11 link. FIG. 3C is a diagram of an example multi-link General Link (GLK) architecture (e.g. 802.11ak). As explained in FIG. 3B, a multi-link architecture may introduce an additional MAC SAP layer to address multi-link scenarios; how this impacts the way 802.11ak works and the requirements on the upper MAC SAP that maps/manages the data flows to/from the lower MAC SAPs may need to be addressed in considering how to approach this issue. Specifically, there may be a multi-link channel feedback procedure for load balancing and optimal interference control as disclosed herein.

The role of the upper MAC SAP (e.g., 311 and 321) in the 802.11ak MAC architecture shown in FIG. 3C may be similar and/or the same as that of the non-802.11ak MAC architecture of FIG. 3B. The upper MAC may provide a MAC SAP that provides the functionality and services of legacy 802.11 MAC SAP for GLK links. As shown in FIG. 3C, two possible direct links may exist 351 and 352 that run through the entire architecture— they may be independent links, and both need not be present. Link 351 line shows the link connecting two LLC sublayers (e.g., 341B to 341D), while link 352 line shows a link connecting two 802.1Q MAC Relay Entities (e.g., 341A to 341C). Both of these may be peer to peer links 351 and 352 may use multiple 802.11 MAC/PHY links (e.g., 307A, 307B, 307C, etc.) to provide the wireless interconnect portion of the link.

Regarding the issue of multi-link acknowledgement for fragmented packets, in a multi-link multi-AP environment, each packet sent by a particular AP on a particular link may be fragmented into a few fragments. If the acknowledgement (e.g., a BA) needs to be transmitted on a different link that may be associated with a different AP, the receiving AP may not be aware of the number of fragments that were transmitted. An acknowledgement protocol may need to be designed to ensure that fragmented transmissions can be accurately acknowledged. For example, in the current ACK and block ACK for 11ax MAC protocol data unit (MPDU) with fragmentation level 1~3, when received by a different AP, cannot convey how many fragments in a MPDU and whether all fragments are received. Additionally, there is a need to address the scenario where fragments are missing, such as protocol for the APs to communicate the missing fragmentation retransmission.

In one scenario, there may be Multi-link acknowledgement for fragmented packets, which may include methods of processing MSDU, where these methods may also be applicable to MMPDU when it describes MSDU. For purposes of demonstration, in this scenario it may be assumed that there are multiple non-collocated APs and each of them may transmit MPDUs from the same traffic ID (TID) to the same non-AP STA. The APs may operate on different channels or different bands. The MSDUs to the non-AP STA may be received at each forwarding AP from a centralized entity. The centralized entity may maintain an originator scoreboard for the TID to perform retransmission of reported missing MPDU based on status indications from the forwarding APs, which receive the Block ACK (BA) bitmap or ACK, sent from the non-AP STA. As discussed herein, this centralized entity may be referred to as an anchor AP. Different forwarding APs may appear to the non-AP STAs to have the same or different MAC addresses. In case of different MAC addresses at different forwarding APs, the non-AP STA may treat the sequence number of MPDUs from different APs to be from the same sequence number space.

The anchor AP may maintain a record of which MSDUn forwarded to which AP (i.e., the forwarding AP of the MSDUn). There may be more than 1 forwarding APs of the MSDUn at the same time if the anchor AP wants to reduce the delay and/or to increase the reliability of the MSDUn.

A status indication may be generated from the forwarding AP of MSDUn to the anchor AP. The indication may identify the success/failure status of a MSDUn (fragment). The indication may indicate that the forwarding AP of MSDUn no longer buffers the MSDUn for transmission, due to acknowledgment or (repeated) failure(s) of MSDUn. A status indication may be generated by an AP that is not the forwarding AP of MSDUn, but the AP generates the indication based on the BA bitmap received form the non-AP STA. A status indication may include a re-fragmentation indication described below, to identify the bitmap from different fragmentation instances (e.g., fragmentation is done differently at different fragmentation instances). A status indication when generated by the forwarding AP may include fragmentation pointers described below such that the anchor AP may instruct a different forwarding AP to perform identical fragmentations of the MSDUn.

A flush indication may be generated from the anchor AP to the forwarding AP of the MSDUn to identify the MSDUn (fragment) and to flush the buffered MSDUn (fragment) at the forwarding AP. This indication may be generated by the anchor AP because it has received an acknowledge of MSDUn (from another AP), or because the anchor AP wants to re-transmit the MSDUn (fragment) from another AP that is not the current the forwarding AP of the MSDUn.

A timer x may be started at the anchor AP when it forwards the MSDUn to the forwarding AP. Upon timer expiry, the anchor AP may transmit a flush indication to the forwarding AP of the MSDUn, to flush the buffered MSDUn (fragment).

A timer x may be started both at the anchor AP and at the forwarding AP of the MSDUn when the anchor forwards the MSDUn to the forwarding AP. Upon timeout of timer x, the forwarding AP may flush the buffered MSDUn (fragments) without a flush indication from the anchor AP.

Within the duration of timer x, the forwarding AP of MSDUn may not flush the buffer of MSDUn, unless it receives a flush indication for MSDUn from the anchor AP.

Each forwarding AP may have independent CSMA/CA and may perform retransmission a number of times. When a status indication is received from an APy identifying a missing MSDUn (fragment), but the MSDUn was previously forwarded to an APx for transmission, the anchor AP may wait for a timer x to expire before it initiates a retransmission of the MSDUn (fragment), where the timer x is started when the MSDUn is forwarded to the APx. Alternatively, the anchor AP may wait for a status indication from APx indicating flushing of MSDUn, before it initiates a retransmission of the MSDUn (fragment).

In one scenario, fragmentation may be disallowed. In this scenario the same MSDUn may be transmitted by different APs. When setting up a block ACK agreement, the originator (AP) may sends an Add Block Acknowledgement (ADDBA) Request frame indicating no fragmentation by setting 'No-fragmentation' field to 1 in the ADDBA Extension element. For TIDs without a block ack agreement, the fragmentation of a MSDU may be disallowed at the transmitter. Alternatively, the retransmission of a MSDU may not be fragmented. Based on 'More Fragments'=0 and (Fragment Number) FN=0, the non-AP STA correctly receives the retransmission of the MSDU may discard previously received fragments of the MSDU.

In one scenario, a retransmission/duplicate transmission may be mandated to be sent from the same AP. In this method, the fragmentation of an MSDU may be allowed. In one case, all MSDUs from the same TID to the same non-AP STA may be forwarded to the same AP for transmission. In this case, the originator scoreboard may be maintained by the transmitting/forwarding AP for the TID.

When the anchor AP receives a status indication indicating a missing MSDUn, or fragment(s) of MSDUn, it may transmit a retransmission indication to the previous forwarding AP of the MSDUn identifying the MSDUn (fragments). The status indication may be generated by an AP which is not the forwarding AP of the MSDUn. The identical fragment of the original transmission is retransmitted from the same forwarding AP.

In one scenario, missing fragments may be identified. There may be 3 levels in 11ax dynamic fragmentation. In levels 1 or 2, there may be at most 1 fragment of the same MSDU in a PSDU. In the acknowledgement in level 1 or 2 methods, the success/failure status of each fragment may not be identified because the originator implicitly knows the status of the transmitted fragment corresponds to the status of the MPDU signaled in the acknowledgement.

In the non-collocated multi-AP environment, if level 1 or 2 mechanism is used, and if a status indication of MSDUn is received from an AP which is not the forwarding AP of the MSDUn, the anchor AP may not be able to identify the missing fragment and the overall success/failure status of the MSDUn may be based on the indication. Only the forwarding AP of the MSDUn may know how to interpret the acknowledgement. To address this situation, an acknowledgement like level 3 bitmap (e.g., k bits per MSDU) may be used.

In 802.11ax level 3 acknowledgement, a bit corresponding a received fragment in a bitmap is set to 1, otherwise the bit is set to 0. With this mechanism, when receiving the status indication from an AP which is not the forwarding AP of the MSDUn, the anchor AP would not be able to identify the missing fragment and the overall success/failure status of the MSDUn based on the indication, because the anchor AP does not know how many fragments the forwarding AP has sent for the MPDU. For example, if maximum fragments allowed per MSDU k=4, bitmap for MSDUn=1110, the anchor AP would not know whether if the MSDUn has 3 fragments and all are received, or if the MSDUn has 4 fragments and the first 3 was received.

To address the above issue, the bitmap generation when the recipient receives the last fragment, or the only fragment, may be revised. The bit positions for the same MPDU following the bit position of the last fragment may be set to 1. In Table 1, for example, k may be equal to 4.

TABLE 1

| Bitmap for MSDUn | Number of fragments of the MSDUn | Example interpretation by the anchor/receiving AP of the bitmap |
|---|---|---|
| 1110 | 4 | The 4$^{th}$ fragment not received |
| 0011 | 3 or 4 | The 1$^{st}$ and 2$^{nd}$ fragment not received |
| 1100 | 3 or 4 | FN> = 2 (the 3$^{rd}$ and possibly the 4$^{th}$ fragment) not received |
| 1111 | 1, 2, 3, or 4 | All fragments are received |

With this method, the anchor AP may know whether to generate a retransmission indication to the forwarding AP of MSDUn. If the indication is generated, the missing FN can either be identified explicitly (e.g., FN=0, FN=1 in row '0011') or implicitly (e.g., FN>=2 in row '1100') to the forwarding AP.

In one case, there may be identical fragmentation at multiple APs. Multiple forwarding APs of the MSDUn may use identical fragmentation. In the status indication, the forwarding AP may indicate fragment pointers which may comprise of the starting octet/length of each fragment and the number of fragments, to the anchor AP. The anchor AP may assign additional forwarding AP of MSDUn, or may assign a new forwarding AP of MSDUn to replace the current forwarding AP. The assignment may contain the fragment pointers. In this case, the retransmission from another (i.e., new) forwarding AP may only contain the missing fragment not delivered by the original (i.e., old) forwarding AP. Alternatively, the fragment pointers may be communicated directly from the original forwarding AP of MSDUn to the new/additional forwarding AP of MSDUn.

In one instance, the fragment pointers are determined by the anchor AP and are indicated to each forwarding AP of MSDUn when the MSDUn is forwarded to the forwarding AP. In this case, the transmission of the fragments may occur simultaneously/independently from all forwarding AP of MSDUn. The BA bitmap can be understood by all forwarding APs of MSDUn to perform retransmission independently.

In one case there may be re-fragmentation and/or different fragmentation at a new/additional forwarding AP. The assigned new/additional forwarding AP of MSDUn may not need to be aware of the fragment pointers from the original/old forwarding AP. The additional/new forwarding AP of MPDUn may perform a different fragmentation. Each forwarding AP may include a re-fragmentation indication in the MPDU or Block ACK Request (BAR) explicitly or implicitly.

An implicit re-fragmentation indication may be based on the MAC address of the forwarding APs, if different forwarding APs have different MAC addresses. The fragments of the same MPDUn from different TAs may require separate buffers for reassembly at the non-AP STA. The RA of the ACK/BA may identify which forwarding AP's fragment the non-AP STA acknowledges.

An explicit re-fragmentation indication may be included in MPDU, BAR, and BA. The indication may be a number where a higher/lower number may mean a more recent fragmentation/transmission of MSDUn.

When the non-AP STA receives a MPDU which is a fragment of MSDUn, it may do one or more actions: it may maintain different reassembly buffers for MSDUn for each re-fragmentation indication and/or, it may only maintain a reassembly buffer for the newest re-fragmentation indication of MSDUn, where the fragment(s) with older fragmentation indication(s) may be flushed.

The BA sent from the non-AP STA may include a corresponding re-fragmentation indication that is mapped to the re-fragmentation indication of the MPDU it acknowledges.

Alternatively, the channel/band or a non-MAC-address identity of the AP from which the MPDU is received or BA is sent to, may serve as an implicit re-fragmentation indication. For instance, for the non-AP STA, the same MPDU received from different APs or on different channels are not guaranteed to have identical fragmentation and may be reassembled independently.

Figures 4, 5:
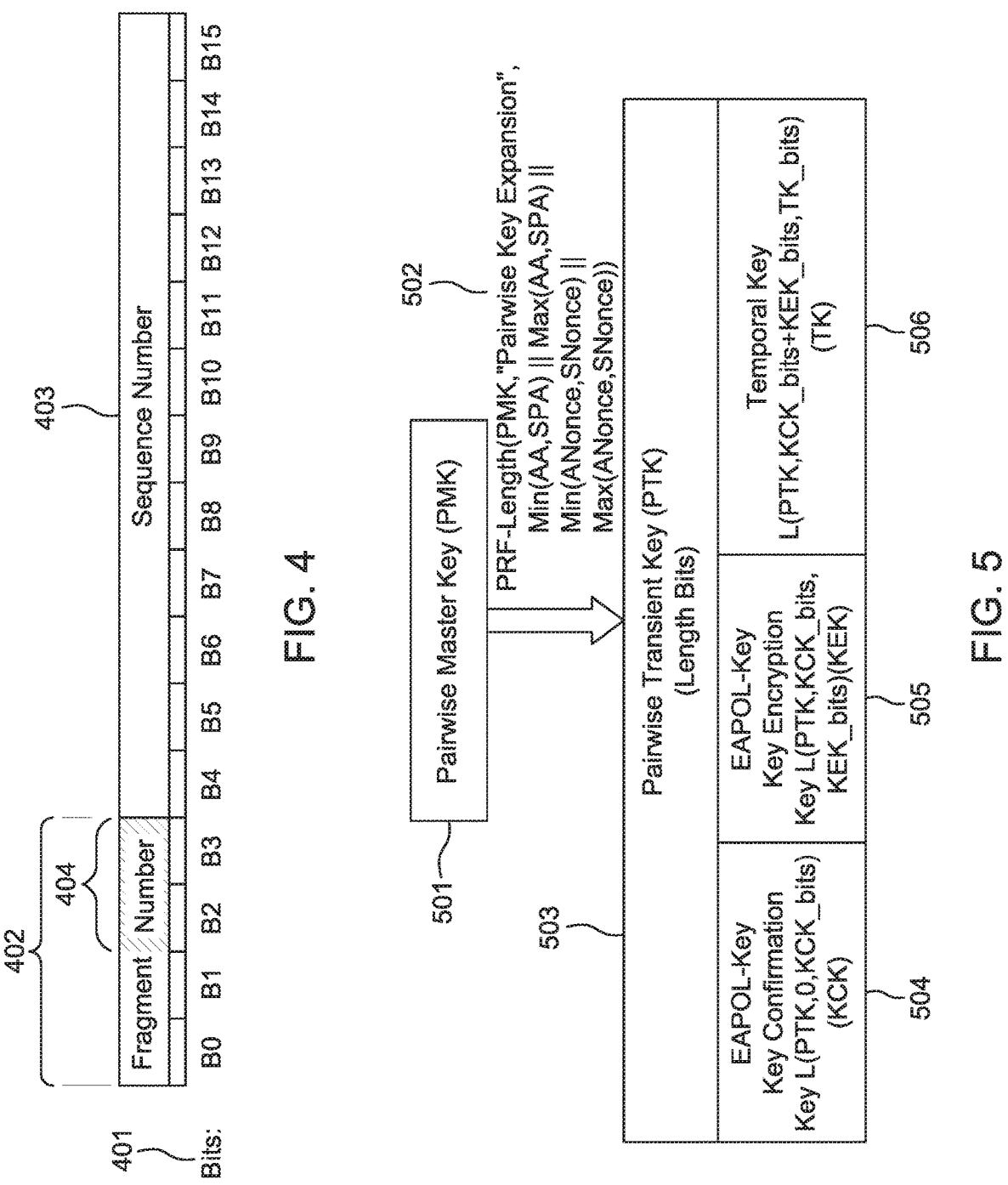
FIG. 4 is a diagram of an example MSB of FN field as re-fragmentation indication in MPDU BAR.
FIG. 5 is a diagram of an example of current PTK derivation.

In one case, there may be a re-fragmentation indication in the MPDU or BAR as shown in illustration of FIG. 4. As shown, a sequence control field of an MPDU may comprise a Fragment Number (FN) 402 (e.g., B0-B3) and a Sequence Number (SN) 403 (e.g., B4-B15). The most significant bits (MSBs) of the FN 402 field may be used as a re-fragmentation indication as shown as the shaded bits 404. For example, if there are a maximum of 4 fragments per MSDU allowed, the 2 MSBs of the FN field (e.g., B2 and B3) may be used as a re-fragmentation indication. The re-fragmentation indication may be incremented/decremented for each new/additional forwarding AP of MSDUn. The value of this indication may be assigned by the anchor AP. For example, in the original transmission from a forwarding APx, the MSDU are fragmented to 3 fragments. The 2 MSBs (e.g., B2 and B3) of the FN field may be set as 00, while 2 LSBs may be set as 00~10 for FN=0~2. In the retransmission from a forwarding APy, the MSDU may be fragmented to 2 fragments. The 2 MSBs of the FN field may be set as 01, while 2 LSBs are set as 00~01 for FN=0~1. The recipient may not use fragments from a different re-fragmentation indication to reassemble the MSDU. For the example above, the recipient may discard the buffered fragments with re-fragmentation indication=00 and SN (Sequence Number)=n, which cannot be assembled to a MSDUn, when it receives MPDUs with a newer re-fragmentation indication=01 and SN=n.

In one case, there may be a re-fragmentation indication in the Block Ack. Reserved bits in the BA control field, or the reserved values in TID_INFO, the FN subfield, Per AID TID Info subfield, or the combination of these reserved fields/values, may be used to signal the value of the re-fragmentation indication. The value may not be the same as the value of a re-fragmentation indication in the corresponding MPDU or BAR, but the value signaled in MPDU/BAR and the value signaled in the BA may have a 1 to 1 mapping, such that the (anchor) AP may correctly interpret the reception status of the indicated re-fragmentation instance.

Regarding the issue of packet number (PN) assignment, in a multi-link multi-AP environment, each packet sent by a particular AP may need to be assigned a packet number to be used for encryption algorithms. Generally, a packet number should not be repeated if different APs use the same key. The issue rephrased may be how to design packet assignment protocols to ensure that packet numbers are not repeated by APs in the same multi-AP set that uses the same keys.

In one case, different keys may be used on each AP. If the different forwarding APs appear to have different MAC addresses for the non-AP STA, then reusing existing Transient Key (TK) generation may generate different TKs for each forwarding AP. This may avoid the issue of assigning the same PN from different APs transmitting different MPDUs to a non-AP STA.

The forwarding APs' MAC addresses may be provided to the supplicant (e.g., non-AP STA) during a 4-way handshake. For example, the addresses may be indicated in the first message from Authenticator (e.g., AP) to Supplicant (e.g., STA).

Alternatively, an extra input may be added to pseudorandom function (PRF), which corresponds to an index (i) of a forwarding AP. FIG. 5 is a diagram of an example PTK derivation. In this example, an index i corresponding to a forwarding AP may be concatenated to the current B parameter of PRF-Length(K,A,B), for example where B=Min(AA, SPA)‖Max(AA,SPA)‖Min(ANonce,SNonce)‖Max(ANonce, SNonce)‖ i, which may be used to derive the Pairwise TK (PTK) 503 of the forwarding AP from the Pairwise Master Key (PMK) 501. In this alternative, the authenticator may indicate a max number of PTKs to be derived (i.e., the range of i) before the key derivation. Later the anchor AP may assign a forwarding AP corresponding to an index i. The PTK 503 may be used to determine the EAPOL-Key 504, EAPOL-Key 505, and Temporal Key 506. The PTK 503 is the concatenation of EAPOL-Key 504, EAPOL-Key 505, and Temporal Key 506. EAPOL-Key 504 is used to provide data origin authenticity in the 4-way handshake and group key handshake messages, EAPOL-Key 505 is used to provide data confidentiality in the 4-way handshake and group key handshake messages. Temporal Key 506 is used to protect individually addressed communication between the AP and the STA outside the 4-way handshake and group key handshake messages.

In some cases, the same key may be used on each AP. Some scenarios may disallow fragmentation or use fragmentation in a specific manner. For example, the fragmentation may not be allowed at the forwarding AP of MSDUn. Alternatively, the methods relating to fragmentation across multiple STAs/APs as described herein, may be used such that there is no need to fragment a MSDU at the forwarding AP of a MSDUn. In either scenario, the anchor AP may assign a packet number (PN) as there is 1 to 1 mapping of MSDU to MPDU.

In one scenario, there may be a partition PN space based on the max number of forwarding APs. A PN assignment may be hierarchical. The anchor AP may determine a subset of the bits based on the max number of forwarding APs, while each forwarding AP may independently assign the rest of bits. For example, if there are 4 forwarding APs, the anchor AP may assign the 2 MSB of PN 00~11 to each of the APs. Each AP then independently generates the LSBs of the PN. In this example, 3 PNs are generated by the same forwarding AP of MSDU, at which a MSDUn is fragmented to 3 MPDUs. The 3 PNs have common 2 MSB and different LSBs. PNs generated at different forwarding APs may have different 2 MSBs but may have the same LSBs.

In one scenario, the PN space may be partitioned based on the max number of fragments. A PN may be generated by an anchor AP with intervals equal to the max number of fragmentations allowed for a non-AP STA. For example, the max number of allowed fragments is 4, and when the anchor AP forwards a MSDUn to a forwarding APx, it may also have a PNx, where PNx %4=0 (PNx Mod 4 is equal to zero). Then the actual PN signaled in the MPDU is PNn+FN, where FN is the fragmentation number of a MSDUn fragment. When an anchor AP forwards MSDU to an additional forwarding APy of MSDUn, a new PN=PNy may be generated for the same MSDUn, where PNy %4=0.

Figure 6:
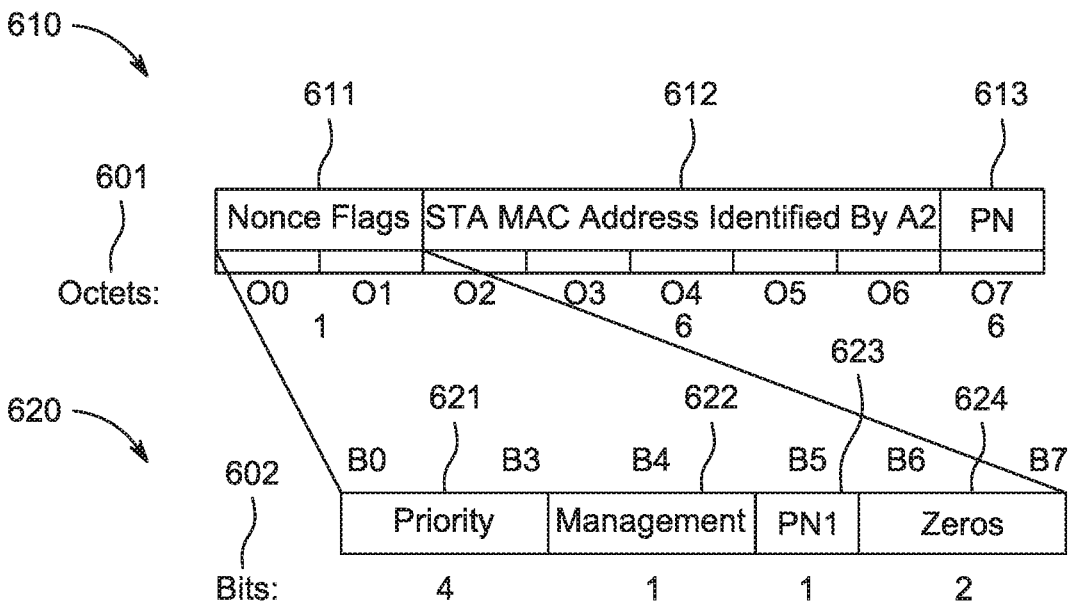
FIG. 6 is a diagram of an example nonce field in COMP.
Figure 7:
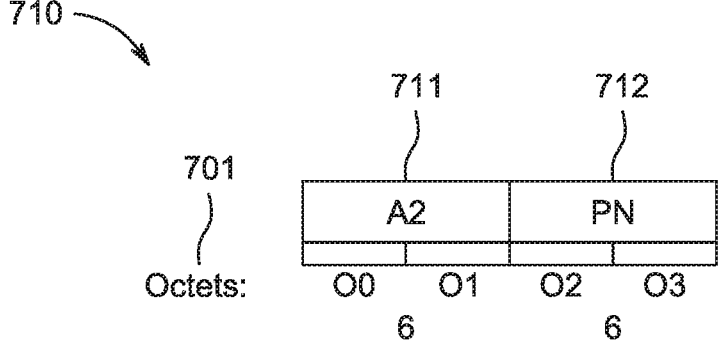
FIG. 7 is a diagram of an example nonce field of GCMP.

In one scenario, there may be a variation in nonce without partitioning the PN space. In this alternative, values of the nonce field may be partitioned to distinct sets. The Nonce field of different security protocol may be shown in FIG. 6 and FIG. 7. FIG. 6 is a diagram of an example of Nonce field in Counter Mode CBC-MAC Protocol (CCMP), which may include Nonce Flags 611, STA MAC Address Identified by A2 612, and/or PN 613. Each octet of bits 601 may represent 8 bits, and the Nonce Flags 611 (e.g. O1) may represents the 4 Priority bits 621 (e.g., B0-B3), 1 Management bit 622 (e.g., B4), the 1 PN1 bit 623 (e.g., B5), and/or 2 Zeros 624 (e.g., B6 and B7). FIG. 7 is a diagram of an example of a Nonce field of Galois/Counter Mode Protocol (GCMP), which may include A2 711 and PN 712.

A PN may be assigned by the forwarding AP, where the PN is independently generated by each forwarding AP without partition of the number space. If a different forwarding AP has a different MAC address, then the uniqueness of the Nonce is guaranteed. If a different forwarding AP has the same MAC address (A2), then the non-AP STA and the forwarding AP may be based on the forwarding AP index, which may be mapped to the channel/band of the PPDU. For example, A2 may be used to construct Nonce=original A2+AP index.

A PN may be assigned by the anchor AP, where the PN is generated by the anchor AP without considering the number of fragments created at the forwarding AP (e.g., incremented by 1 for each MSDU). For the retransmission of the MSDU to a different forwarding AP, a new PN may be generated. The non-AP STA and the forwarding AP may be based on the FN to modify the A2 field (e.g., A2 may be used to construct Nonce=original A2+FN).

Regarding fragmentation across multiple STAs/APs, in order to improve data flow balance over the available links, to improve latency and to improve reliability, current fragmentation designs may not be sufficient. The issue rephrased may be how to design more efficient fragmentation in other parts of the multi-link MAC architecture.

In one case, there may be fragmentation across multiple STAs/APs. The upper MAC layer may manage the data flows to/from a lower MAC SAPs below it and if it does so the peer upper MAC layer may also manage the data flows from/to the lower MAC SAPs below it. The management of the data flow may include packet fragmentation, packet aggregation, multi-packet encoding/de-encoding, packet redundancy, packet retransmission, fragment retransmission, fragmentation of aggregated packets for retransmission, ACK management, Block ACK management, HARQ management, data management functions. These capabilities may be used to: improve data flow balance over the available links (e.g., each link could be managed to provide a data rate consistent with link conditions and wireless load for the channel); increase effective data flow rate (i.e., enhanced throughput); reduce latency; and/or, increase transmission reliability (e.g., the fragmentation may include some redundancy).

In one scenario, there may be the improvement of data flow balance. An upper MAC may be aware of the throughput and latency of all the individual lower MACs it is managing based on performance, in addition WLAN radio measurements for each of the individual upper MACs may be available. This information may be used by the upper MAC to balance the data flows on each of the available links, optimizing the overall performance of the multi-link link (e.g., the effective link made up by combining the multiple links). The upper MAC may optimize the link for one specific metric or a combination of multiple metrics, metrics such as: data rate, latency, reliability, or any other performance metric. This can be done both dynamically based on real time or near real time link information, based on longer term performance averages, or any other combination of the performance metrics to manage the links (e.g., individual link load).

In one scenario, effective data flow may be increased. Effective data flow though the multi-link link may combine the throughput of the individual links to create an effective bandwidth much larger than any individual link. Current broad band 802.11 links rely on broadband channels (e.g., 80, 160 MHz) to provide high throughput. However, these broadband channels sometimes have issues with narrow band traffic (e.g., 20 MHz) traffic sharing part of their broadband channel, which can cause packet loss or packet delay as various MAC methods (e.g., overhead) are employed to insure the coexistence of the narrow band and broadband channels. Aggregation of channels via multi-link need not rely on these methods as multiple channels can be combined to allow for broadband throughput data rate, while not simultaneously requiring all channels be clear for transmission at the same time. Additionally, multi-link may allow for the ability to combine links that do not use channels in the same band (2.4 GHz, 5 GHz, or 6 GHz). This may allow multi-link devices to greatly increase the effective channel bandwidth, and therefore the throughput capabilities, to be greater than 20, 40, 60, 80, or 160 MHz bandwidth allowed today. For example, the effective channel bandwidth could comprise of two 20 MHz channels in the 2.4 GHz band, three 80 MHz Channels in the 5 GHz band, and an 80 MHz and a 40 MHz channel in the 6 GHz band, yielding an effective bandwidth of 400 MHz. In addition to the ability to combine these channel resources into a broad effective bandwidth, each channel may be optimized for throughput based on the performance of the radio link and the availability of the link; thereby allowing for optimization of the overall network, while still achieving the desired throughput goals.

In one scenario, there may be reduced latency. The MAC as disclosed herein may also optimize overall link performance for latency. As 802.11 uses contention-based channel access, the access to any given resource may be delayed by the resource being in use. If the transmission of data is forced to rely on a single link for transmission, the delay of transmission is dependent on a single channel contention mechanism. However, when multi-links are used the channel contention may be spread across multiple channels, with each channel having its own channel contention mechanism. This spreading across multiple channels may have the effect of shortening the latency as the data may be transmitted on whichever channel is available first. The next packet may be transmitted on which ever channel is available next, and so on, which will statistically lower the latency for transmission.

In one scenario, there may be increased reliability. The upper MAC may also optimize overall link performance for reliability. This may be accomplished by sending redundant packets over multiple links and combining the received packets in the MAC. Also, a packet may be encoded so that part of the packet is sent over multiple links and then the encoded received packets are combined to increase the reliability of the multi-link link.

Regarding the issue of multi-link acknowledgement, a WLAN device may be operating in different links for transmitting. Acknowledgements or aggregated acknowledgements for previous transmissions over multiple links may be used to reduce the signaling overhead and provide a more flexible and low latency feedback mechanism. To address this issue, there may be detailed procedures to negotiate data transmissions and acknowledgements over multiple links, such as a multi-link acknowledgement procedure.

With multi-link transmissions, a STA that is capable to operate on more than one link (i.e., multi-link capable STA) may communicate with another multi-link capable STA over more than one link. As discussed herein, a link may refer to a band or channel. In one architecture, the multi-link capable STA may have a unique MAC address over multiple links. The transmissions over multiple links may share the same sequence number space, such that the receiver may be able to order the packets received from different links. In one example, the data transmissions and acknowledgement may be on different links. Or the data transmissions may be carried in N links while the acknowledgement may be carried in M links.

STAs and APs may exchange their multi-link acknowledgement capability using management/control frames, such as probe request, probe response, beacon, association, and/or reassociation frames.

Figure 8:
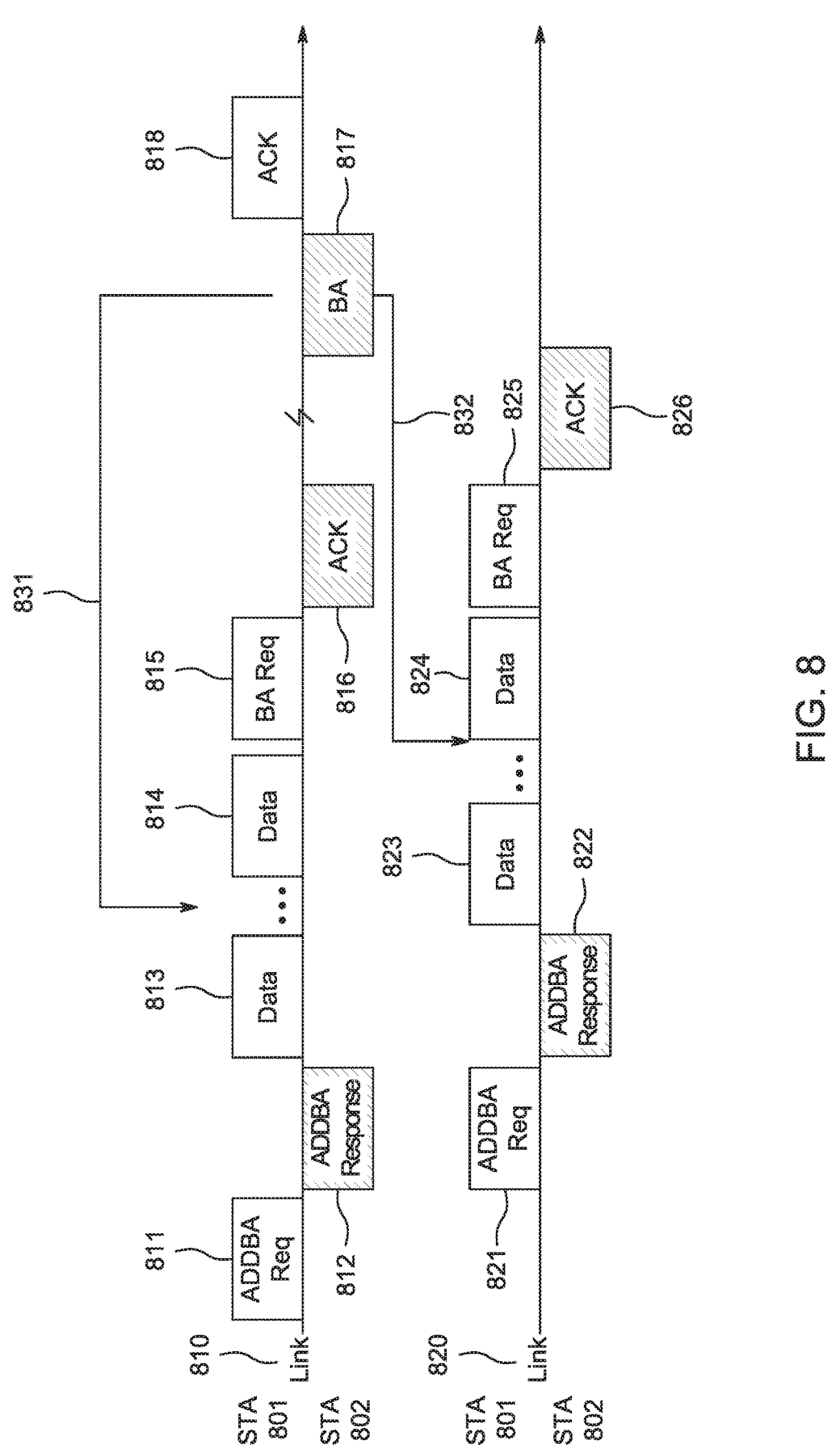
FIG. 8 is a diagram of an example procedure for multi-link delayed block acknowledgement.

In one case, there may be a multi-link delayed block acknowledgement (ACK). To enable multi-link acknowledgement, there is a need for a modified approach to block ACK negotiation and procedures. FIG. 8 is a diagram of an example procedure with delayed block ACK.

As shown in FIG. 8, a first STA, such as STA 801, may start a block ACK negotiation with a second STA, such as STA 802. STA 801 may acquire a channel on link 810 and transmit a Multi-link (ML) add block ACK (ADDBA) Request frame at 811 to STA 802. In the ML ADDBA Req frame, the STA 801 may include multi-link negotiation, sequence_space, TID setting, buffer_size, and/or other related information as disclosed herein.

The buffer_size is a subfield that may be used for buffer size negotiation between transmitting STA(s) and receiving STA(s). In one method, the transmitting STA(s) and receiving STA(s) may negotiate buffer size for each link. Link index may be used for this negotiation. STAs may maintain a buffer for each link. Each link may have different buffer sizes. In one method, the transmitting STA(s) and receiving STA(s) may negotiate total buffer size for all the available operating links. STAs may maintain a buffer for all the links.

The sequence_space is a subfield that may indicate whether the same sequence space may be used for multiple links. In the case that multiple sequence spaces may be used for multiple links, a link index may be used together with a sequence number to assemble the packets.

The multi-link negotiation subfield may one or more pieces of information, such as: acknowledgement_link; ACK_in_different_link; multi-link ACK/BA aggregation; cross_link_fragmentation; and/or, operating_link.

The acknowledgement_link subfield may indicate on which link the acknowledgement may be transmitted. In one method, a link bitmap may be used. For example, if the receiving STA may operate on N links, then the bitmap may carry N bits. Each bit may indicate whether the corresponding link may be used to transmit acknowledgement(s). In one method, link indices may be explicitly carried to indicate the corresponding link(s) that may be used to transmit acknowledgement. A special link index may be used to indicate that all of the links may be used.

ACK_in_different_link is a subfield that may indicate an acknowledgement that may be transmitted on a different link than the data link. In one method, if this is signaled, STA2 may be allowed to transmit the block ACK in a link that may be available sooner than the rest of the links.

Multi-link ACK/BA aggregation is a subfield that may indicate whether multi-link aggregated ACK/BA is allowed. Here multi-link aggregated ACK/BA may be a procedure that allows ACK/BA transmitted on Link k to indicate data transmission on link ($L_1 \ldots L_M$).

Cross_link_fragmentation is subfield that may indicate whether a fragmented MSDU can be carried in multiple links.

Operating_links is a subfield that may indicate the operating links of the transmitting STA. Alternatively, this subfield may be used to negotiate operating links between the transmitting STA(s) and receiving STA(s). For example, a transmitting STA may include its operating links in this subfield in the ADDBA Request frame. The set of operating links may be denoted as S_tx. A receiving STA may select links in S_tx which the receiving STA is able to operate and put them in the Operating_links subfield when the receiving STA sends the ADDBA Response frame back.

Referring to FIG. 8, STA 802 may respond with a block ACK negotiation to STA 801. Specifically, STA 802 may transmit Multi-link (ML) ADDBA Response frame at 812 to STA 802. STA 801 may include one or more pieces of information in ML_ADDBA Request frame. In the ML_ADDBA Response frame the STA 802 may indicate its settings. STA 801, on reception of the response, may adjust its BA transmission procedures accordingly.

The above mentioned ADDBA Request/Response frame exchange may happen in other link(s) (e.g., link 820). The exchange may also vary in some aspect. In one instance, STA 801 may acquire channels over all the links, and transmit ADDBA request frame concurrently over all the links. In one instance, the STA 801 may perform independent EDMA/CA on multiple link, where the STA 801 may transmit immediately after acquiring the link. In some instances, the ADDBA Request/Response frame may be defined using one of the following: the ADDBA request/response frames may be duplicated over multiple links, where each frame may carry information of multi-links; and/or, the ADDBA request/response frames may be different over multiple links, where each frame may carry common information of multi-links and link dependent information.

After ADDBA Req/Resp exchanges, STA 801 may transmit data frames in link 810 and link 820 (e.g., 813, 814, 823, 824). The transmissions may follow the settings negotiated in the ADDBA Req/Resp frames (e.g., 811, 812, 821, 822).

After the transmission of data frames, STA 801 may transmit a BA Request frame 815. In this frame, STA 801 may indicate whether immediate or delated BA is requested. STA 801 may also indicate whether multi-link BA or multi-link aggregated BA may be requested. In the example of FIG. 8, delayed BA may be requested.

STA 802 may respond with an ACK frame 816 after reception of the BA Request frame, where the ACK frame 816 acknowledges the recently of the BA Request frame 815.

Based on the ADDBA negotiation, STA 802 may prepare the transmission of BA in one or more links (e.g., 810 and/or 820). Generally, an ACK/BA may include acknowledgments for MPDUs from multiple links/APs, and/or acknowledgements for QoS data frames with two or more TID using the BA. If multi-link aggregation is agreed, STA 802 may transmit multi-link aggregated BA 817; note that the BA for one link (e.g., 810), and/or all links (e.g., aggregated 810 and 820) may be transmitted in another link (e.g., 820). For example, see BA 817 sent on link 820 at 832. All examples and functions described with link 810 may also occur with link 820, and vice versa.

Note that for FIG. 8, while only two STAs are explicitly shown, there may be four logical STAs (e.g., one for each end of a link), where each link may correspond to its own link between two logical STAs, and where there are multiple logical STAs in each physical STA unit/housing (e.g., each STA 810 and STA 820).

Figure 9:
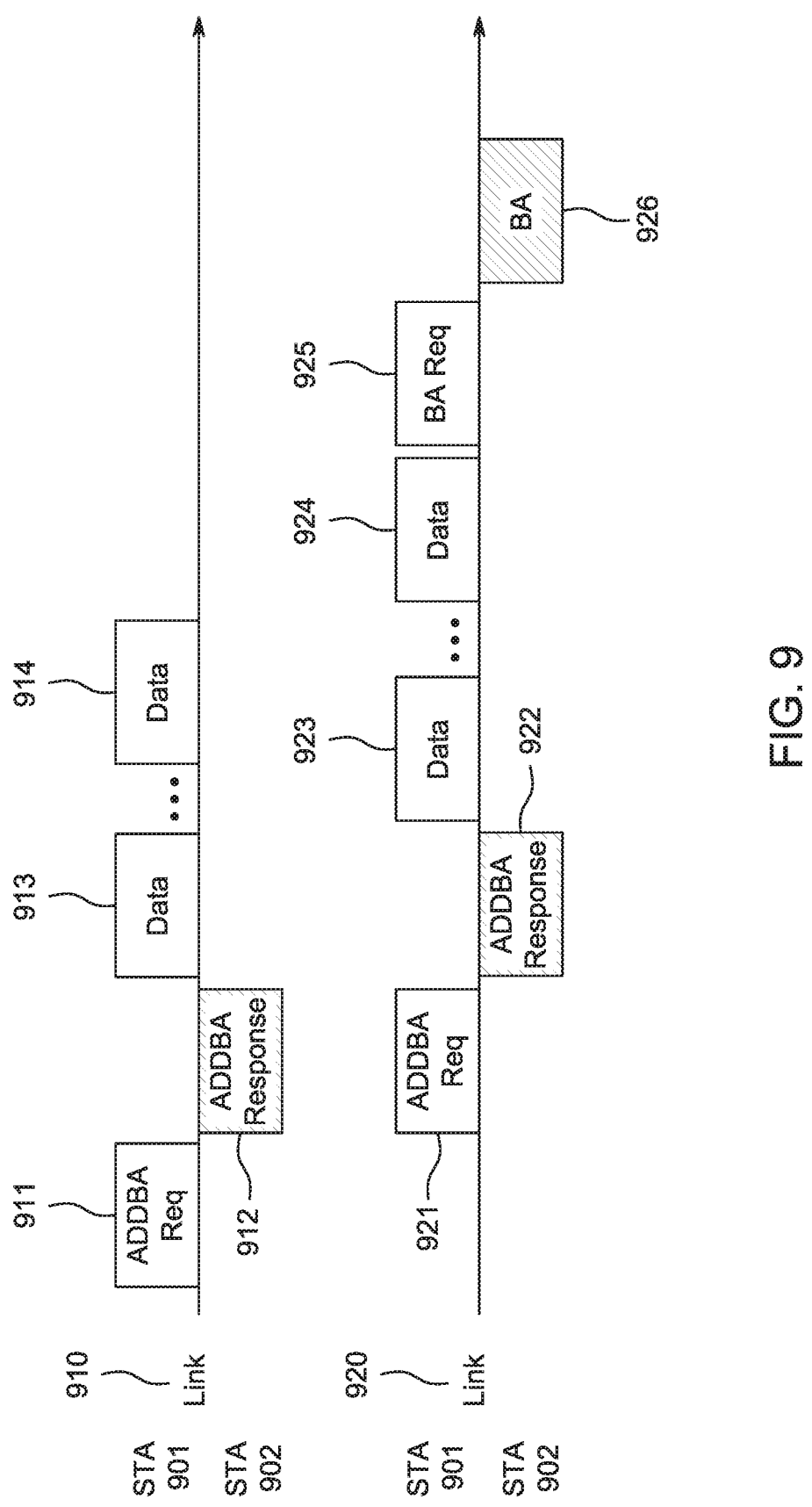
FIG. 9 is a diagram of an example procedure for multi-link immediate block acknowledgement.

In one case, there may be a multi-link immediate block ACK procedure as shown in FIG. 9, in contrast to the example of FIG. 8 which shows a BA request. To enable multi-link acknowledgement, there may be a variation to the block ACK negotiation and procedure. As shown, the multi-link ADDBA Request/Response frames exchange (e.g., 911, 912, 921, 922) may happen in one or more links as disclosed herein (e.g., 910 and 920). After ADDBA Req/Resp exchanges (e.g., 911, 912, 921, 922), STA 901 may transmit data frames (e.g., 913, 914, 923, 924) in link 910 and link 920. The transmissions may follow the setting negotiated in ADDBA Req/Resp frames (e.g., 911, 912, 921, 922).

After the transmission of data frames, STA 901 may transmit BA Request frame (e.g., 925) in one of the links (e.g., 920). In this frame, STA 901 may indicate whether immediate or delayed BA is requested. STA 901 may also indicate whether multi-link BA or multi-link aggregated BA may be requested. In one instance, BA may be transmitted in the same link of BAR. In one instance, STA 901 may transmit BAR in link 920, and this implicitly indicates the BA transmission should be in link 920 too. In our example, immediate multi-link aggregated BA 926 is requested.

STA 902 may prepare multi-link aggregated BA and transmit it (e.g., 926) on the link BAR was sent.

Similarly for FIG. 8, while only two STAs are explicitly shown, there may be four logical STAs (e.g., one for each end of a link), where each link may correspond to its own link between two logical STAs, and where there are multiple logical STAs in each physical STA unit/housing (e.g., each STA 910 and STA 920).

In one case, there may be a multi-link BA over a home link. A home link may be predefined and agreed by APs and associated STAs. A simplified ADDBA request/response frame exchange may be used. In this frame exchange, STAs may negotiate that multi-link BA may be allowed. The BAR and BA frames may be transmitted over the home link. The procedure/negotiation of home link may be similar to the other negotiations/procedures as disclosed herein.

In one case, there may be multi-link BA frames. In the aforementioned procedures relating to FIGS. 8 and 9 reference is made to STAs that may be non-AP STAs and/or AP STAs. In the aforementioned procedures relating to FIGS. 8 and 9 some frames may need to be modified. For example, the Multi-Link BA Capability element, and/or the Multi-Link ADDBA Request and Multi-Link ADDBA Response may be defined as action frame. Multi-link ADDBA Request/Response frame action field format may be defined in Table 2. The underlined fields in Table 2 may be modified. The italicized fields may be modified or reinterpreted to accommodate multi-link features, as described herein.

TABLE 2

Modified ML ADDBA Request/Response Frame Action Field

| Order | Information |
|---|---|
| 1 | Category |
| 2 | _BlockAckAction_ |
| 3 | Dialog Token |
| 4 | _BlockAckParameterSet_ |
| 5 | _BlockAckTimeoutValue_ |
| 6 | _BlockAckStarting SequenceControl_ |
| 7 | GCR Group Address element (optional) |
| 8 | Multi-band (optional) |
| 9 | TCLAS (optional) |
| 10 | ADDBA Extension (optional) |

Block Ack Action field values may be modified in Table 3. Two new fields, ML ADDBA Request and ML ADDBA Response may be added:

TABLE 3

Modified Block Action Fields

| Block ACK Action field values | Meaning |
|---|---|
| 0 | ADDBA Request |
| 1 | ADDBA Response |
| 2 | DELBA |
| 3 | ML ADDBA Request |
| 4 | ML ADDBA Response |
| 5 | Reserved |

Block Ack Parameter Set field may be modified in Table 4. A new field, Links, with x bits is added. In one method, the Links field may indicate the links for both data and acknowledgement transmissions. In one method, the Links may have two subfields. One subfield may be for data links another may be for acknowledgement links.

TABLE 4

Modified Block Ack Parameter Set Field

| | A-MSDU Supported | Block Ack Policy | TID | Links | Buffer Size |
|---|---|---|---|---|---|
| Bits | 1 | 1 | 4 | x | 10 |

The Block Ack Timeout Value field may indicate the timeout value for BA in all the links. In one example, per-link Block Ack Timeout value may be carried.

The Block Ack Starting Sequence Control may be a sequence number space is used for all the links and this field may indicate the starting sequence for frames over all the links. In one example, multiple sequence number spaces are used for multiple links and this field may indicate the per-link starting sequence.

Table 5 shows an example of including Block Ack Request (BAR) frame. Underlined fields may be modified to fulfil Multi-Link BAR (ML BAR).

TABLE 5

Modified Block Acknowledgment Request Frame

| Frame Control | Duration | RA | TA | BAR Control | BAR Information | FCS |
|---|---|---|---|---|---|---|

A BAR Control field may be modified also, as shown in Table 6. A reserved combination of Multi-TID, Compressed Bitmap and GCR may be used to indicate it is a multi-link BAR.

TABLE 6

Modified Block Acknowledgment Request Control Field

| BAR Ack policy | Multi-TID | Compressed Bitmap | GCR | reserved | TID_Info |
|---|---|---|---|---|---|

In one method, a BAR Control field defined in 802.11ax is shown in Table 7. A reserved value in BA Type may be used to indicate this is a ML BAR.

TABLE 7

Modified Bar Control Field Defined in 802.11ax

| BAR Ack policy | BA Type | Reserved | TID_Info |
|---|---|---|---|

If the combination may indicate a multi-link BAR, the BAR Info field may carry a Multi-links field. This field may indicate the link to transmit BA. A value may be used to indicate the BA may be transmitted over all the links. A value may be used to indicate the BA may be transmitted over the same link as BAR.

The BA frame is defined 802.11. Underlined fields may be modified to fulfil Multi-Link BA (ML BA).

TABLE 8

Modified Block Acknowledgement Frame

| Frame Control | Duration | RA | TA | BA Control | BA Information | FCS |
|---|---|---|---|---|---|---|

A reserved value in the BA Control field may be used to indicate this is a ML BA. Once this field is set to indicate ML BA, the BA Information field may carry Per Link Info fields. Each Per Link Info field may carry Link ID field, and corresponding Ack Type, and BA information.

In one case, there may be multi-link multi-STA BA (ML MU BA) procedures that enable acknowledgement aggregation from multiple STA and multiple links.

STAs and APs may exchange their multi-link multi-STA acknowledgement capability using management/control frames, such as probe request, probe response, beacon, association, and/or re-association frames.

FIG. 10 is a diagram of an example procedure for multi-link multi-STA acknowledgement. In this example, multiple STAs (e.g., STA 1001, STA 1002, STA 1003) may transmit UL frames to an AP (e.g., AP 1000) over one more or more links (e.g., 1010 and 1020). The ML MU BA procedure may be defined to aggregate the acknowledgement transmissions from the AP to one or more STAs over one or more links.

AP 1000 with ML MU acknowledgement capability may schedule UL transmissions for ML MU acknowledgement capable STAs (e.g., STA 1001 and 1002) by transmitting one or more ML MU Trigger frames 1011 in the available link

1010. In one instance, the ML MU Trigger frame transmission over multiple links may be synchronized. The AP 1000 may sense and acquire channels, and transmit ML MU Trigger frames concurrently. In one instance, the ML MU Trigger frame may be transmitted over each available link right before the triggered UL PPDUs asynchronously. In the example shown in FIG. 10, the AP 1000 may sense the channel on both link 1010 and link 1020. Link 1010 may be available first, and the AP 1000 may transmit a ML MU Trigger frame 1011 to trigger transmission from STA 1001 and STA 1002. Later on, link 1020 may be available, and the AP may transmit a ML MU Trigger frame 1021 to trigger transmission from STA 1001 and STA 1003. In the ML MU Trigger frame, an AP may indicate one or more of pieces of information.

One example of the indicated information may be whether multi-link multi-STA aggregated acknowledgement may be supported. For example, one field may indicate the trigger frame is ML MU Trigger and the ML MU acknowledgements may be expected.

One example of the indicated information may be a link list for ML MU BA. This list may include links on which the aggregated ML MU BA may acknowledge. The STAs transmitted on the link may expect to receive a ML MU BA on the same or a different link.

One example of the indicated information may be a sequence_space subfield. This subfield may indicate whether the same sequence space may be used for multiple links. In the case that multiple sequence spaces may be used for multiple links, a link index may be used together with sequence number to assemble the packets.

One example of the indicated information may be a Buffer_size subfield. This subfield may be used for buffer size negotiation between transmitting STA(s) and receiving STA(s). In one method, the receiving STA (e.g., which may be an AP in uplink transmission) may determine the buffer size for each intended STA over all the links and inform the STAs in the ML MU Trigger frame. The AP may signal the buffer size in a common field in a Trigger frame, which may be a value commonly used by all the STAs. Alternatively, the AP may signal the buffer size in a STA specific field in a Trigger frame, which may be different from STA to STA. In one method, the receiving STA (e.g., the AP in uplink transmission) may determine the buffer size for each intended STA per link and inform the STAs in the ML MU Trigger frame. The AP may signal the buffer size common field in a Trigger frame, which may be a value commonly used by all the STAs per link. Alternatively, the AP may signal the buffer size in a STA specific field in the Trigger frame, which may be different from STA to STA per link. Alternatively, the buffer information may be carried in management frames, such as association request/response, beacon frame, probe request/response frame, and the like.

After detecting the ML MU Trigger frame(s), the desired STA may prepare UL transmission on the link. The UL packet size may be limited by the buffer size that the AP allowed. The STA may expect that the acknowledgement is based on the signaling in the ML MU Trigger frame. For example, if the ML MU BA is supported, the STA may expect an aggregated ML MU BA frame transmitted from one of the operating link.

An ML MU Trigger frame may be defined as a trigger type. For example, Trigger Type field located in a Common Info field may be modified to have a value to indicate ML MU Trigger frame as shown in Table 9.

TABLE 9

| Trigger Type Subfield value | Trigger frame variant |
| --- | --- |
| 0 | Basic |
| 1 | BF Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | ML MU Trigger |
| 9-15 | Reserved |

A Trigger Dependent User Information field located in the User Info field in trigger frame, may contain one or more of the following information: buffer size per user among all the links; buffer size per user per link; operating link list; and/or, acknowledgement transmission link. The acknowledgement transmission link field may be used to indicate the link on which the acknowledgement may be transmitted. Also, the address field in the ML MU Trigger frame may be modified. For example, the transmitter address may be the virtual AP's address, where the virtual AP represents the APs on multiple links.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although SIFS is used to indicate various inter frame spacing in the examples of the designs and procedures, all other inter frame spacing such as RIFS, AIFS, DIFS or other agreed time interval could be applied in the same solutions.

Although four RBs per triggered TXOP are shown in some figures as example, the actual number of RBs/channels/bandwidth utilized may vary.

As disclosed herein, there may be systems, methods, and devices for enabling multi-link wireless local area networks (WLAN). One or more non-AP station (STA) multi-link devices (MLDs) and one or more Access Point (AP) MLD may establish a multi-link association between each other, thereby establishing a multi-link connection that enables improved and more efficient wireless communication.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a non-access point (non-AP) multi-link device (MLD), the method comprising:

sending a request to an access point (AP) MLD via a first link, the request comprising an element for multi-link operation, wherein the element comprises a first identifier, wherein the first identifier comprises a virtual identifier, and wherein the first identifier is a medium access control address;

receiving a response to the request from the AP MLD, the response including a single second identifier associated with each of a plurality of links of the multi-link operation for the non-AP MLD, wherein the second identifier is an association identifier (AID), wherein the second identifier is the same for the plurality of links of the multi-link operation for the non-AP MLD, and wherein the second identifier is a different identifier than the first identifier; and communicating with the AP MLD, using a multi-link operation based on the second identifier.

2. The method of claim 1, wherein the first identifier comprises an identifier of the non-AP MLD.

3. The method of claim 1, wherein there is a physical layer and a logical entity at the non-AP MLD and AP MLD for each link of the plurality of links of the multi-link operation.

4. The method of claim 1, wherein the response comprises a beacon, the beacon comprising a multi-link element that indicates multi-link capabilities of one or more APs affiliated with the AP MLD.

5. The method of claim 1, wherein the non-AP MLD comprises a plurality of stations.

6. The method of claim 1, further comprising receiving channel information for the multi-link operation.

7. The method of claim 1, wherein the AP MLD comprises a plurality of APs, and wherein the AP MLD and the plurality of APs are discovered based on the request comprising the second identifier associated with the plurality of links of the multi- link operation.

8. A non-Access Point (AP) multi-link device (MLD), the non-AP MLD comprising a processor operatively coupled to a transceiver, the processor configured to:

send, via the transceiver, a request to an access point (AP) MLD via a first link, the request comprising an element for multi-link operation, wherein the element comprises a first identifier, wherein the first identifier comprises a virtual identifier, and wherein the first identifier is a medium access control address;

receive, via the transceiver, a response to the request from the AP MLD, the response including a single second identifier associated with each of a plurality of links of the multi-link operation for the non-AP MLD, wherein the second identifier is an association identifier (AID), wherein the second identifier is the same for the plurality of links of the multi-link operation for the non-AP MLD, and wherein the second identifier is a different identifier than the first identifier; and communicate, via the transceiver, with the AP MLD, using a multi-link operation based on the second identifier.

9. The non-AP MLD of claim 8, wherein there is a physical layer and a logical entity at the non-AP MLD and AP MLD for each link of the plurality links of the multi-link operation.

10. The non-AP MLD of claim 8, wherein the response comprises a beacon, wherein the beacon comprises a capabilities a multi-link element that indicates multi-link capabilities of one or more APs affiliated with the AP MLD.

11. The non-AP MLD of claim 8, the processor further configured to receive, via the transceiver, channel information for the multi-link operation.

12. The non-AP MLD of claim 8, wherein the non-AP MLD comprises a plurality of stations.

13. The non-AP MLD of claim 8, wherein the AP MLD comprises a plurality of APs, and wherein the AP MLD and the plurality of APs are discovered based on the request comprising the second identifier associated with the plurality of links of the multi-link operation.

14. The non-AP MLD of claim 8, wherein the first identifier comprises an identifier of the non-AP MLD.

* * * * *